(12) United States Patent
Oprea

(10) Patent No.: US 7,327,795 B2
(45) Date of Patent: Feb. 5, 2008

(54) SYSTEM AND METHOD FOR WIRELESS COMMUNICATION SYSTEMS

(75) Inventor: Alexandru M. Oprea, North York (CA)

(73) Assignee: Vecima Networks Inc., Victoria (CA)

( * ) Notice: Subject to any disclaimer, the term of this patent is extended or adjusted under 35 U.S.C. 154(b) by 709 days.

(21) Appl. No.: 10/401,955

(22) Filed: Mar. 31, 2003

(65) Prior Publication Data

US 2004/0190636 A1   Sep. 30, 2004

(51) Int. Cl.
H04K 1/10   (2006.01)
(52) U.S. Cl. ............................. 375/260; 375/267
(58) Field of Classification Search ........... 375/260, 375/267, 140, 156, 147, 152, 295, 340, 347; 370/208–210, 203, 280, 345, 441, 442, 465, 370/319, 480
See application file for complete search history.

(56) References Cited

U.S. PATENT DOCUMENTS

| | | | |
|---|---|---|---|
| 5,282,222 A | 1/1994 | Fattouche et al. |
| 5,345,244 A | 9/1994 | Gildea et al. |
| 5,345,599 A | 9/1994 | Paulraj et al. |
| 5,471,647 A | 11/1995 | Gerlach et al. |
| 5,479,447 A | 12/1995 | Chow et al. |
| 5,515,378 A | 5/1996 | Roy, III et al. |
| 5,523,761 A | 6/1996 | Gildea |
| 5,528,248 A | 6/1996 | Steiner et al. |
| 5,541,614 A | 7/1996 | Lam et al. |
| 5,555,268 A | 9/1996 | Fattouche et al. |
| 5,589,835 A | 12/1996 | Gildea et al. |
| 5,592,490 A | 1/1997 | Barratt et al. |
| 5,596,329 A | 1/1997 | Searle et al. |
| 5,634,199 A | 5/1997 | Gerlach et al. |
| 5,642,353 A | 6/1997 | Roy, III et al. |
| 5,699,365 A | 12/1997 | Klayman et al. |

(Continued)

FOREIGN PATENT DOCUMENTS

EP   0 899 894 A2   3/1999

(Continued)

OTHER PUBLICATIONS

Tao, W.Y., Cheng, R.S., Letaief and K.B., Adaptive Space-time Coding System in Fading Channels, IEEE, 2001, pp. 103-107.

(Continued)

Primary Examiner—Chieh M. Fan
Assistant Examiner—Jaison Joseph
(74) Attorney, Agent, or Firm—Bereskin & Parr

(57) ABSTRACT

A system and method for transmitting a plurality of input data symbol sub-streams over a plurality of spatial-subspace channels of a sub-carrier between a transmitter and the receiver. The plurality of input data symbol sub-streams are partitioned in a plurality of super-frames of data and weighted by a weight matrix derived from the singular value decomposition of a channel matrix corresponding to the sub-carrier by applying a partial SVD algorithm. The transmitter further inserts subspace training symbols into the plurality of input data symbol sub-streams and the receiver periodically processes the sub-space training symbols during each super-frame of the plurality of super-frames for estimating output data related to the input data symbol stream.

54 Claims, 9 Drawing Sheets

U.S. PATENT DOCUMENTS

| | | |
|---|---|---|
| 5,722,051 A | 2/1998 | Agrawal et al. |
| 5,815,116 A | 9/1998 | Dunbridge et al. |
| 5,828,658 A | 10/1998 | Ottersten et al. |
| 5,861,841 A | 1/1999 | Gildea et al. |
| 5,887,262 A | 3/1999 | Willhoff |
| 5,953,659 A | 9/1999 | Kotzin et al. |
| 6,005,854 A | 12/1999 | Xu et al. |
| 6,058,105 A | 5/2000 | Hochwald et al. |
| 6,061,327 A | 5/2000 | Demoulin et al. |
| 6,067,290 A | 5/2000 | Paulraj et al. |
| 6,097,771 A | 8/2000 | Foschini |
| 6,101,399 A | 8/2000 | Raleigh et al. |
| 6,122,260 A | 9/2000 | Liu et al. |
| 6,128,276 A | 10/2000 | Agee |
| 6,131,016 A | 10/2000 | Greenstein et al. |
| 6,137,785 A | 10/2000 | Bar-Ness |
| 6,141,567 A | 10/2000 | Youssefmir et al. |
| 6,144,711 A | 11/2000 | Raleigh et al. |
| 6,175,550 B1 | 1/2001 | van Nee |
| 6,177,906 B1 | 1/2001 | Petrus |
| 6,192,068 B1 | 2/2001 | Fattouche et al. |
| 6,195,064 B1 | 2/2001 | Andrews et al. |
| 6,212,242 B1 | 4/2001 | Smith et al. |
| 6,219,561 B1 | 4/2001 | Raleigh |
| 6,229,486 B1 | 5/2001 | Krile |
| 6,236,363 B1 | 5/2001 | Robbins et al. |
| 6,236,839 B1 | 5/2001 | Gu et al. |
| 6,239,760 B1 | 5/2001 | Van Voorhies |
| 6,243,049 B1 | 6/2001 | Chandler |
| 6,246,369 B1 | 6/2001 | Brown et al. |
| 6,252,548 B1 | 6/2001 | Jeon |
| 6,298,092 B1 | 10/2001 | Heath, Jr. et al. |
| 6,317,466 B1 | 11/2001 | Foschini et al. |
| 6,377,631 B1 | 4/2002 | Raleigh |
| 6,377,632 B1 | 4/2002 | Paulraj et al. |
| 6,377,819 B1 | 4/2002 | Gesbert et al. |
| 6,389,066 B1 | 5/2002 | Ejzak |
| 6,400,780 B1 | 6/2002 | Rashid-Farrokhi et al. |
| 6,442,214 B1 | 8/2002 | Boleskei et al. |
| 6,452,981 B1 | 9/2002 | Raleigh et al. |
| 6,470,043 B1 | 10/2002 | Lo et al. |
| 6,721,371 B1 | 4/2004 | Barham et al. |
| 6,785,341 B2 | 8/2004 | Walton et al. |
| 7,164,649 B2 | 1/2007 | Walton et al. |
| 2001/0033622 A1 | 10/2001 | Jongren et al. |
| 2002/0034263 A1 | 3/2002 | Schmidl et al. |
| 2002/0054650 A1 | 5/2002 | Alamouti et al. |
| 2002/0102940 A1 | 8/2002 | Bohnke et al. |
| 2002/0111142 A1 | 8/2002 | Klimovitch |
| 2002/0114269 A1 | 8/2002 | Onggosanusi et al. |
| 2002/0122383 A1 | 9/2002 | Wu et al. |
| 2002/0142723 A1 | 10/2002 | Foschini et al. |
| 2002/0147953 A1 | 10/2002 | Catreux et al. |
| 2002/0181624 A1 | 12/2002 | Gonzalez et al. |
| 2003/0072255 A1* | 4/2003 | Ma et al. ............... 370/208 |
| 2003/0218973 A1 | 11/2003 | Oprea et al. |
| 2003/0235255 A1* | 12/2003 | Ketchum et al. ........... 375/285 |
| 2004/0192218 A1 | 9/2004 | Oprea |

FOREIGN PATENT DOCUMENTS

| | | |
|---|---|---|
| EP | 1 100 214 A2 | 5/2001 |
| EP | 1 185 001 A2 | 6/2002 |
| EP | 1 185 048 A2 | 6/2002 |
| JP | 2000-049648 | 2/2000 |
| WO | WO98 09381 | 3/1998 |
| WO | WO98 09395 | 3/1998 |
| WO | WO 98/42150 | 9/1998 |
| WO | WO 99/40689 | 9/1998 |
| WO | WO 99/48302 | 9/1999 |
| WO | WO 99/57820 | 11/1999 |
| WO | WO 00/72496 A1 | 11/2000 |
| WO | WO 00/79718 A2 | 12/2000 |
| WO | WO 01/08369 A1 | 2/2001 |
| WO | WO 01/11719 A1 | 2/2001 |
| WO | WO 01/11723 A1 | 2/2001 |
| WO | WO 01/13466 A1 | 2/2001 |
| WO | WO 01/19101 A1 | 3/2001 |
| WO | WO 01/31812 A1 | 5/2001 |
| WO | WO 01 33761 A1 | 5/2001 |
| WO | WO 01/45300 A1 | 6/2001 |
| WO | WO 01/65795 A1 | 9/2001 |
| WO | WO 01 91476 A2 | 11/2001 |
| WO | WO 02/03557 A1 | 1/2002 |
| WO | WO 02/03568 A1 | 1/2002 |
| WO | WO 02/07371 A2 | 1/2002 |
| WO | WO 02/25853 A2 | 3/2002 |
| WO | WO 02 31990 A2 | 4/2002 |
| WO | WO 03/100986 A2 | 12/2003 |

OTHER PUBLICATIONS

Sampath, H. and Paulraj, A.J., Joint Transmit and Receive Optimization for High Data Rate Wireless Communication Using Multiple Antennas, IEEE, 1999, pp. 215-219.

Gesbert, D., Haumonte, L., Bolcskei, H., Krishnamoorthy, R. and Paulraj, A.J., Technologies and Performance for Non-Line-of-Sight Brandband Wireless Access Networks, IEEE Communications Magazine, Apr. 2002, pp. 86-95.

Foschini, Gerard J., Layered Space-Time Architecture for Wireless Communication in a Fading Environment When Using Multi-Element Antennas, Bell Labs Technical Journal, 1996, pp. 41-59.

Tehrani, A.M., Hassibi, A., Cioffi, J. and Boyd, S., An Implementation of Discrete Multi-Tone Over Slowly Time-Varying Multiple-Input/Multiple-Output Channels, IEEE, 1998, pp. 2806-2811.

Martone, Max, An Experimental Hardware Prototype for Fixed Wireless Broadband Access at 60-400 Mbit/sec in 4.6 MHz, IEEE, 2001, pp. 547-551.

Thomas, Julie Dodd, The Spectrum Rubik's Cube: Updating the Latest Innovations in Wireless Technologies, Broadband Properties, Feb. 2003, pp. 37-39.

Andersen, Jorgen Bach, Multiple Antennas—The Promise of High Spectral Efficiency, Tebtronikk, 2001 vol. 97 pp. 40-48.

Andersen, Jorgen Bach, Array Gain and Capacity for Known Random Channels with Multiple Element Arrays at Both Ends, IEEE Journal on Selected Areas in Communications, Nov. 2000, vol. 18, No. 11, pp. 2172-2178.

Andersen, Jorgen Bach, Role of Antennas and Propagation for the Wireless Systems Beyond 2000, Wireless Personal Communications, 2001, pp. 303-310, Netherlands.

The Technology Transforming the Wireless World, www.iospanwireless.com/technology/tech_link32.html, Aug. 3, 2001.

Alamouti, S. M., A Simple Transmit Diversity Technique for Wireless Communications, IEEE Journal on Select Areas in Communications, Oct. 1998, vol. 18, No. 8, pp. 1451-1458.

Biglieri, E. and Di Torino, O., Digital Transmission in the 21st Century: Conflating Modulation and Coding, IEEE Communications Magazine, May 2002, pp. 128-137.

Cimini L J et al, "Clustered OFDM With Transmitter Diversity And Coding" Communications: The Key To Global Prosperity. Globecom 1996. London, Nov. 18-22, 1996, Global Telecommunications Conference (Globecom), New York, IEEE, US, vol. 1, Nov. 18, 1996, pp. 703-707.

Catreaux, S. and Erceg, V., Adaptive Modulation and MIMO Coding for Broadband Wireless Data Networks, IEEE Communications Magazine, Jun. 2002, pp. 108-115.

Goldsmith, A.j., and Chua, S., Variable-Rate Variable-Power, MQAM for Fading Channels, IEEE Transactions on Communications, Oct. 1997, vol. 45, No. 10, pp. 1218-1230.

Jelitto, J., Bronzel, M. and Fettweis, G., From Smart Antennas to Reduced Dimension Space-Time Processing, Frequens, J. of Telecommun, vol. 55, Nos. 5-6, May 2001.

Keller, T. and Hanzo, L., Adaptive Multicarrier Modulation: A Convenient Framework for Time-Frequency Processing in Wireless Communications, IEEE Proceedings of the IEEE, May 2000, vol. 88, No. 5, pp. 611-640.

Lai, S.K., Cheng, R. S., Letaief, K.B. and March, R.D., Adaptive Trellis Coded MQAM and Power Optimization for OFDM Transmisiion, IEEE, 1999, pp. 290-294.

Lawrey, E., Multiuser OFDM, Fifth International Symposium on Signal Processing and its Applications, ISSPA '99, Aug. 22-25, 1999, pp. 761-764, Brisbane Austria.

Sampath, H., Talwar, S., Tellado, J. and Erceg, V., A Fourth-Generation MIMO-OFDM Broadband Wireless System: Design, Performance, and Field Trial Results, IEEE Communications Magazine, 2002, pp. 143-149.

International search report for related application PCT/CA03/00737, date of mailing Nov. 27, 2003.

Copy of IPER for related international application PCT/CA03/00737, date mailed Apr. 11, 2004.

Copy of Office Action for related U.S. Appl. No. 10/401,953, date mailed Jul. 25, 2006.

Copy of Office Action for related U.S. Appl. No. 10/402,215, date mailed Apr. 20, 2007.

Copy of written opinion for related application PCT/CA03/00737, date of mailing Apr. 22, 2004.

Copy of revised pages of ISR for related application PCT/CA03/00737, date of mailing Dec. 29, 2003.

Kaizhi Huang et al. Smart antenna and spatial diversity-combining, Vehicular Technology Conference. IEEE 55th Vehicular Tecnology Conference. VTC Spring 2002 Cat. No. 02CH37367). vol. 1 ISBN-0 7803 7484 3 Corporates author: State Key Lab. On Microwave & Digital Commun., Tsinghua Univ., Beijing, China.

Cho, Kelzo; Hori, Toshikaz; Nishimori, Kentaro; Yasushi, Smart antennas for high-speed wireless access systems, vol. 51, No. 6, 2002, pp. 462-468 ISSN-0915-2326.

Cho, Keizo; Mizuno, Hideki; Nishimori, Kentaro; Takatori, Yasushi, Fundamental techniques and future trends in smart antenna technology, vol. 51, No. 6, 2002, pp. 437-446, ISSN-0915-2326.

Arantes, Dalton S.; Cardoso, Fabbryccio A.C.M; Fernandes, Marcelo A.C., Space-time processing for smart antennas in advanced receivers for the user terminal in 3G WCDMA systems, p. 296-297, ISSN-0747-668X, Conference Date: Jun. 18, 2002/Jun. 20, 2002, Journal Name: Digest of Technical Papers, IEEE International Conference on Consumer Electronics.

Matsuoka, H; Sun, Y., A novel adaptive antenna architecture-subcarrier clustering for high-speed OFDM systems in presence of rich co-channel interference, IEEE Veh Technol Conf vol. 3, 2002 p. 1564-1568, ISSN - 0740-0551, Conference Date:May 6, 2002/May 9, 2002, 55th Vehicular Technology Conference IEEE Vehicular Technologu Conference.

Larsson, E.G.; Li, H; Li, J; Liu, J, Differential space-code modulation for interface suppression IEEE Transactions on Signal Processing, vol. 49, No. 8, Aug. 2001, p. 1786-1795 ISSN 1053-587X.

G. J. Foschini and M.J. Gans "On limits of Wireless Communications in a Fading Environment when Using Multiple Antennas", Lucent Technologies, Wireless Personal Communications 6: 311-335, 1998.

Schmidl, Cox, Robust Frequency and Timing Synchronization for OFDM, IEEE Transaction on Communications, vol. 45, No. 2, Dec. 1997, pp. 1613-1621.

Cheng, R.S.; Verdu, S., Gaussian multi-access channels with ISI: Capacity region and multi-user water filling, IEEE Trans Inform Theory, vol. 39, No. 3, pp. 773-785, May 1993.

US RE36,533, 01/2000, Fattouche et al. (withdrawn)

* cited by examiner

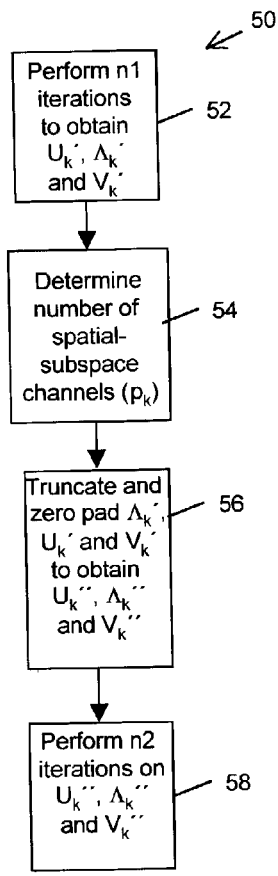
FIGURE 2
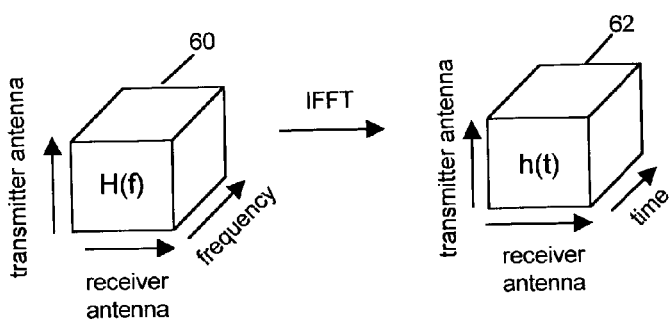
FIGURE 3a
FIGURE 3b
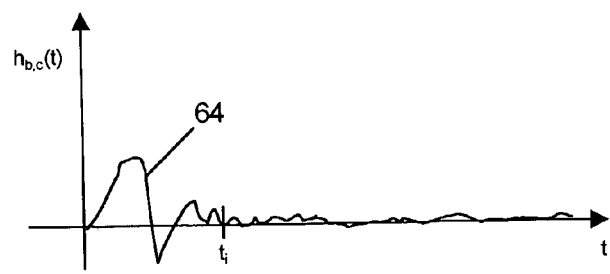
FIGURE 3c
FIGURE 3d

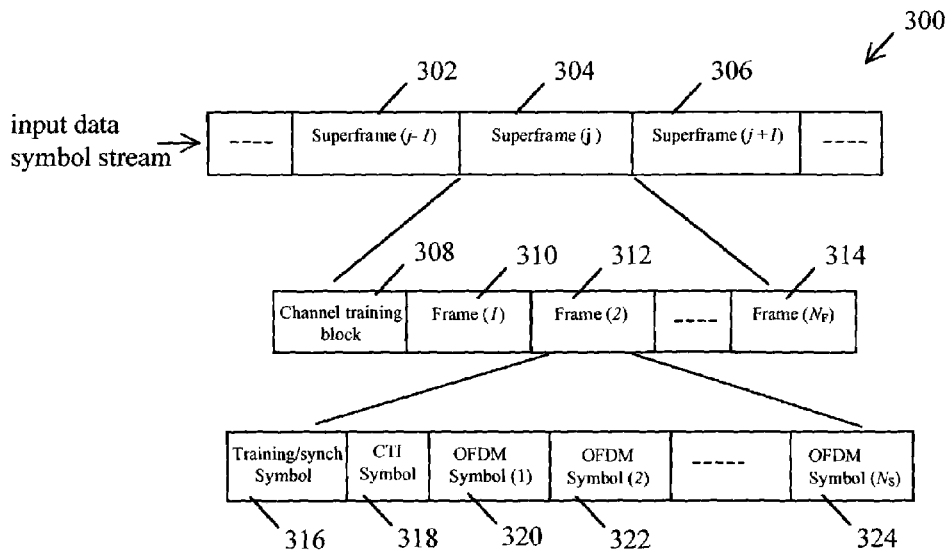
Figure 6a
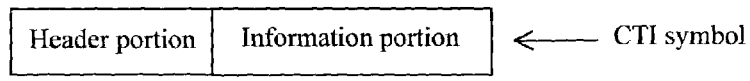
Figure 6b
Figure 6c
Figure 6d

| Subspace | OFDM Frame number | | | | | | | | | | | |
|---|---|---|---|---|---|---|---|---|---|---|---|---|
| | 12i+1 | 12i+2 | 12i+3 | 12i+4 | 12i+5 | 12i+6 | 12i+7 | 12i+8 | 12i+9 | 12i+10 | 12i+11 | 12i+12 |
| $S_{k1}$ | $\Lambda T_1$ | | | | | | | | | | | |
| $S_{k2}$ | | | | $\Lambda T_2$ | | | | | | | | |
| $S_{k3}$ | | | | | | | $\Lambda T_3$ | | | | | |
| $S_{k4}$ | | | | | | | | | | $\Lambda T_4$ | | |

Figure 7a

| TX | OFDM Frame number | | | | | | | | | | | |
|---|---|---|---|---|---|---|---|---|---|---|---|---|
| | 12i+1 | 12i+2 | 12i+3 | 12i+4 | 12i+5 | 12i+6 | 12i+7 | 12i+8 | 12i+9 | 12i+10 | 12i+11 | 12i+12 |
| 1 | $\Lambda T_1$ | | | $\Lambda T_2$ | | | $\Lambda T_3$ | | | $\Lambda T_4$ | | |
| 2 | $\Lambda T_1$ | | | $\Lambda T_2$ | | | $\Lambda T_3$ | | | $\Lambda T_4$ | | |
| 3 | $\Lambda T_1$ | | | $\Lambda T_2$ | | | $\Lambda T_3$ | | | $\Lambda T_4$ | | |
| 4 | $\Lambda T_1$ | | | $\Lambda T_2$ | | | $\Lambda T_3$ | | | $\Lambda T_4$ | | |
| 5 | $\Lambda T_1$ | | | $\Lambda T_2$ | | | $\Lambda T_3$ | | | $\Lambda T_4$ | | |
| 6 | $\Lambda T_1$ | | | $\Lambda T_2$ | | | $\Lambda T_3$ | | | $\Lambda T_4$ | | |
| 7 | $\Lambda T_1$ | | | $\Lambda T_2$ | | | $\Lambda T_3$ | | | $\Lambda T_4$ | | |
| 8 | $\Lambda T_1$ | | | $\Lambda T_2$ | | | $\Lambda T_3$ | | | $\Lambda T_4$ | | |

Figure 7b

| TX | OFDM Frame number | | | | | | | | | | | |
|---|---|---|---|---|---|---|---|---|---|---|---|---|
| | 12i+1 | 12i+2 | 12i+3 | 12i+4 | 12i+5 | 12i+6 | 12i+7 | 12i+8 | 12i+9 | 12i+10 | 12i+11 | 12i+12 |
| 1 | $\Lambda T_1$ | SY | | $\Lambda T_2$ | | | $\Lambda T_3$ | | | $\Lambda T_4$ | | |
| 2 | $\Lambda T_1$ | | SY | $\Lambda T_2$ | | | $\Lambda T_3$ | | | $\Lambda T_4$ | | |
| 3 | $\Lambda T_1$ | | | $\Lambda T_2$ | SY | | $\Lambda T_3$ | | | $\Lambda T_4$ | | |
| 4 | $\Lambda T_1$ | | | $\Lambda T_2$ | | SY | $\Lambda T_3$ | | | $\Lambda T_4$ | | |
| 5 | $\Lambda T_1$ | | | $\Lambda T_2$ | | | $\Lambda T_3$ | SY | | $\Lambda T_4$ | | |
| 6 | $\Lambda T_1$ | | | $\Lambda T_2$ | | | $\Lambda T_3$ | | SY | $\Lambda T_4$ | | |
| 7 | $\Lambda T_1$ | | | $\Lambda T_2$ | | | $\Lambda T_3$ | | | $\Lambda T_4$ | SY | |
| 8 | $\Lambda T_1$ | | | $\Lambda T_2$ | | | $\Lambda T_3$ | | | $\Lambda T_4$ | | SY |

Figure 7c

SYSTEM AND METHOD FOR WIRELESS COMMUNICATION SYSTEMS

FIELD OF THE INVENTION

The invention relates to a system and method for wireless communication and more particularly, this invention relates to a system and method for adaptive channel separation in a wireless communication system.

BACKGROUND OF THE INVENTION

Modern wireless communication systems are designed to provide reliable communication at the highest possible bit rate for a given environment. However, there is still a pressing and persistent need for increasingly higher data speed and bandwidth. The available bit rate for an application depends on a number of different parameters such as: available bandwidth, total radiated power at the transmitter, characteristics of the propagation environment, and cost of implementation as well as other factors.

There are several approaches for increasing the bit rate given the above constraints. One of these approaches involves the use of Multiple Input Multiple Output (MIMO) systems which comprise multiple antennas at both the transmitter and the receiver. A MIMO system provides an opportunity to exploit spatial channel diversity thereby increasing the spectral efficiency and error performance of a wireless communication system. Space-time coding may also be used to distinguish the signals that are sent by the various transmitter antennas as well as to increase the robustness of the MIMO system to errors caused by noise and the multi-path phenomenon.

Another approach for increasing bit rate is to simultaneously transmit information on a plurality of independent frequencies that are orthogonal to one another. This technique is known as Orthogonal Frequency Division Multiplexing (OFDM) in which there are a plurality of sub-carriers that are narrowband and orthogonal to each other. Each sub-carrier carries a data symbol and the sub-carriers are transmitted simultaneously in large numbers to achieve a high overall data rate. OFDM is an effective transmission modulation scheme for combating the adverse effects of noise sources and in particular multipath fading. OFDM is typically implemented using the Fast Fourier Transform (FFT) which is a well-known process for transforming a non-orthogonal signal into a plurality of orthogonal components (i.e. sub-carriers).

Another approach for increasing the throughput of the MIMO system is to decompose the multiple channels into several independent channels through the use of Singular Value Decomposition (SVD). The SVD of the channel matrix (which defines the interaction of each transmitter antenna with each receiver antenna) can be used to decompose a MIMO system having M transmitter antennas (i.e. M inputs) and N receiver antennas (i.e. N outputs) into p-one dimensional channels (where p<M and p<N). The channel matrix (i.e. the matrix H) has M rows and N columns and is estimated at the initial-setup of the MIMO system by using training symbols as is well known to those skilled in the art. The SVD of the channel matrix H is calculated to obtain a triplet of matrices (U, $\Lambda$ and V*) where * represents the complex conjugate transpose. The matrix $\Lambda$ is the singular value matrix which represents the independent channels. The matrix V is used to weight the data that is transmitted by the transmitter antennas and the matrix U* is used to weight the data that is received by the receiver antennas. Accordingly, either the channel matrix H or the matrix V must be sent to the transmitter. Furthermore, the channel matrix H is updated on a periodic or intermittent basis during regular data transmission since the channel will vary during the operation of the MIMO system (i.e. the channel is considered to be quasi-static). Accordingly, the U, $\Lambda$ and V* matrices vary during the operation of the MIMO system.

Another approach for increasing throughput is a MIMO system which combines OFDM and SVD. In this case, the MIMO system comprises a plurality of sub-carriers which each have an associated channel matrix ($H_k$ for a sub-carrier k). The SVD is calculated for each of the channel matrices $H_k$ and the channel matrix $H_k$ or the $V_k$ matrix is transmitted to the transmitter for each of the sub-carriers. For exemplary purposes, given a MIMO system with 8 transmitter antennas and 8 receiver antennas, the channel matrix $H_k$ is an 8×8 matrix. Assuming 16 bits are used to encode a real number and 16 bits are used to calculate an imaginary number, an 8×8 channel matrix $H_k$ (which in general contains complex numbers) requires 8×8×(16+16)=2048 bits of data. With an OFDM system which uses 768 carriers, there will be 768 channel matrices which requires 768*2048=1.5 Mbits of data. Further, assuming that each channel matrix $H_k$ is updated every millisecond, then the data rate required simply for sending each channel matrix $H_k$ to the transmitter is 1 GHz which is excessive.

As discussed, instead of sending the channel matrices $H_k$ to the transmitter, the $V_k$ weight matrices may be sent. The row size of each $V_k$ matrix is equal to the number of receiver antennas and the column size of each $V_k$ matrix is equal to the number of useable subspaces that result from the singular value decomposition of the corresponding channel matrix $H_k$. Assuming that there are four useable subspaces, 16 bits are used to encode a real number and 16 bits are used to encode an imaginary number, an 8×4 $V_k$ matrix (which contains complex numbers) requires 8×4×(16+16)=1024 bits of data. Once again, assuming an OFDM system which uses 768 carriers, there will be 768 $V_k$ matrices which requires 768*1024=0.78 Mbits of data. This translates to a data rate of 0.8 GHz assuming that each $V_k$ matrix is updated every millisecond.

Accordingly, a MIMO system which incorporates both OFDM and SVD requires a large data rate for providing channel information to the transmitter. This issue is more pronounced if frequency division duplexing is also used. In addition, the SVD operation is an iterative algorithm which is computationally intensive and must be performed for each channel matrix $H_k$, every millisecond. Both of these operations in their present form are computationally intensive and are not suitable for an efficient SVD-based MIMO system.

SUMMARY OF THE INVENTION

In a first aspect, the present invention provides a transmitter for processing an input data symbol stream for transmission over a plurality of spatial-subspace channels of a sub-carrier. The transmitter comprises a transmitter SVD unit for calculating an approximation of a transmit weight matrix from a channel matrix corresponding to the sub-carrier by applying a partial SVD algorithm in which the transmitter SVD unit truncates an interim version of the transmit weight matrix to calculate the approximation of the transmit weight matrix. The transmitter further comprises a transmitter weighting unit connected to the transmitter SVD unit for weighting a plurality of input data symbol sub-streams with the approximation of the transmit weight matrix for distributing the plurality of input data symbol sub-streams along the plurality of spatial-subspace channels. The plurality of input data symbol sub-streams are derived from the input data symbol stream.

In second aspect, the present invention provides a receiver for processing received spatial-subspace data on a plurality of spatial-subspace channels of a sub-carrier. The receiver comprises a receiver SVD unit for calculating an approximation of a receive weight matrix from a channel matrix corresponding to the sub-carrier by applying a partial SVD algorithm in which the receiver SVD unit truncates an interim version of the receive weight matrix to calculate the approximation of the receive weight matrix. The receiver further comprises a receiver weighting unit connected to the SVD unit for weighting the received spatial-subspace data with the approximation of the receive weight matrix.

In another aspect, the present invention provides a method for processing an input data symbol stream for transmission over a plurality of spatial-subspace channels of a sub-carrier. The method comprises: a) calculating an approximation of a transmit weight matrix from a channel matrix corresponding to the sub-carrier by applying a partial SVD algorithm which comprises truncating an interim version of the transmit weight matrix to calculate the approximation of the transmit weight matrix; and, b) weighting a plurality of input data symbol sub-streams with the approximation of the transmit weight matrix for distributing the plurality of input data symbol sub-streams along the plurality of spatial-subspace channels. The plurality of input data symbol sub-streams are derived from the input data symbol stream.

In another aspect, the present invention provides a method for processing received spatial-subspace data on a plurality of spatial-subspace channels of a sub-carrier. The method comprises: a) calculating an approximation of a receive weight matrix from a channel matrix corresponding to the sub-carrier by applying a partial SVD algorithm which comprises truncating an interim version of the receive weight matrix to calculate the approximation of the receive weight matrix; and, b) weighting the received spatial-subspace data with the approximation of the receive weight matrix.

In another aspect, the present invention provides a communication system comprising a transmitter having a transmitter antenna array and a receiver having a receiver antenna array. The communication system transmits an input data symbol stream over a plurality of spatial-subspace channels of a sub-carrier between the transmitter and the receiver. The input data symbol stream is partitioned into a plurality of super-frames. The transmitter further comprises a subspace training unit for inserting subspace training symbols into a plurality of input data symbol sub-streams and producing a plurality of input data/training symbol sub-streams. The plurality of input data symbol sub-streams are derived from the input data symbol stream. The transmitter also comprises a transmitter SVD unit for providing a transmit weight matrix corresponding to the sub-carrier at a beginning of each super-frame in the plurality of super-frames; and, a transmitter weighting unit connected to the subspace training unit and the transmitter SVD unit for weighting the plurality of input data/training symbol sub-streams with the transmit weight matrix for distributing the plurality of input data/training symbol sub-streams along the plurality of spatial-subspace channels and providing transmit-weighted spatial-subspace data. The receiver periodically processes the sub-space training symbols during each super-frame of the plurality of super-frames for estimating output data related to the input data symbol stream.

In another aspect, the present invention provides a data structure for transmitting data over a plurality of spatial-subspace channels of a sub-carrier between a transmitter and a receiver. The data structure comprises a plurality of super-frames with each of the plurality of super-frames comprising a channel training block followed by a plurality of frames. Each of the plurality of frames comprise: a) a slot for at least a portion of a sub-space training sequence; b) a slot for at least a portion of a synchronization sequence; and, c) a plurality of slots for data sequences. The sub-space training sequence allows the receiver to track variations in one of the plurality of spatial-subspace channels.

In another aspect, the present invention provides a method for transmitting an input data symbol stream over a plurality of spatial-subspace channels of a sub-carrier between a transmitter and a receiver. The input data stream is partitioned into a plurality of super-frames. At the transmitter, the method comprises: a) inserting subspace training symbols into a plurality of input data symbol sub-streams and producing a plurality of input data/training symbol sub-streams, the plurality of input data symbol sub-streams being derived from the input data symbol stream; b) providing a transmit weight matrix corresponding to the sub-carrier at a beginning of each super-frame in the plurality of super-frames; and, c) weighting the plurality of input data/training symbol sub-streams with the transmit weight matrix for distributing the plurality of input data/training symbol sub-streams along the plurality of spatial-subspace channels and providing transmit-weighted spatial-subspace data. The receiver periodically processes the sub-space training symbols during each super-frame of the plurality of super-frames for estimating output data related to the input data symbol stream.

BRIEF DESCRIPTION OF THE DRAWINGS

For a better understanding of the present invention and to show more clearly how it may be carried into effect, reference will now be made, by way of example only, to the accompanying drawings which show a preferred embodiment of the present invention and in which:

FIG. 2 is a flow diagram of a partial SVD algorithm used by the SVD-based OFDM-MIMO communication system of FIG. 1;

FIG. 3a is a diagrammatic representation of the channel information in the frequency domain for the OFDM-MIMO system of FIG. 1;

FIG. 3b is a diagrammatic representation of the channel information in the time domain for the OFDM-MIMO system of FIG. 1;

FIG. 3c is a diagrammatic representation of the relation between the channel information in the time and frequency domains;

FIG. 3d is a graph of a typical impulse response for the OFDM-MIMO system of FIG. 1;

FIG. 5b is a block diagram of the transmitter of the SVD-based OFDM-MIMO communication system of FIG. 5a;

FIG. 5c is a block diagram of the receiver of the SVD-based OFDM-MIMO communication system of FIG. 5a;

FIG. 6a is a diagram illustrating the general data structure used in the communication system of FIGS. 5a to 5c comprising OFDM super-frames;

FIG. 6b is a diagram of the data structure of a channel training block used in an OFDM super-frame for channel estimation;

FIG. 6c is a diagram of the data structure of a CTI symbol used in an OFDM frame;

FIG. 6d is a diagram of the distribution of synchronization symbols SY used in the synchronization of OFDM frames;

FIG. 7a is a diagram of a data structure employing a time-division multiplexing scheme for subspace tracking on the spatial-subspace channel level;

FIG. 7b is a diagram of the time-division multiplexing scheme for incorporating subspace training symbols ΛT for tracking subspace information on the transmitter antenna level;

FIG. 7c is a diagram of the data structure of OFDM frames incorporating subspace training symbols ΛT for tracking subspace information and synchronization symbols SY for synchronization;

DETAILED DESCRIPTION OF THE INVENTION

Figure 1:
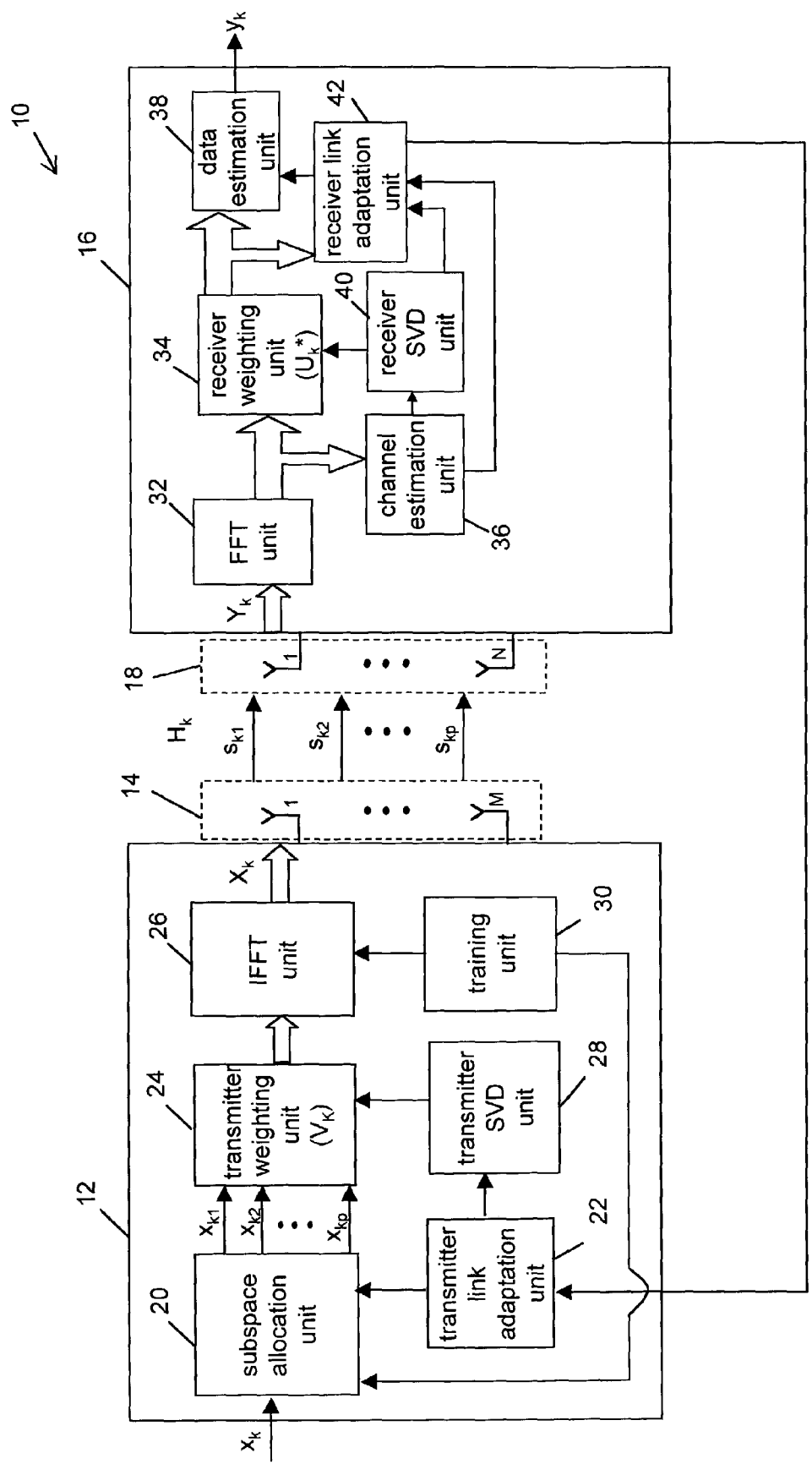
FIG. 1 is a block diagram of an SVD-based OFDM-MIMO communication system in accordance with the present invention.

Referring to FIG. 1, shown therein is a block diagram of an SVD-based OFDM-MIMO communication system 10 in accordance with the present invention. The communication system 10 comprises a transmitter 12 with a transmitter antenna array 14 having M transmitting antenna elements, and a receiver 16 with a receiver antenna array 18 having N receiving antenna elements. The transmitter 12 and the receiver 16 are connected by a multi-path communications channel. The transmitter 12 processes an input data symbol stream, which generally comprises complex data symbols, by allocating a portion of the input data symbol stream $x_k$ to different spatial-subspace channels of a given sub-carrier k, and providing a stream of (different) OFDM data symbol waveforms to each antenna element of the transmitter antenna array 14. It should be understood that the term data symbol stream represents a stream of data symbols where each data symbol is related to a group of input data bits (as explained below). A data symbol should not be confused with an OFDM data symbol. An OFDM data symbol is a collection of data symbols across all OFDM sub-carriers.

The OFDM data symbol waveforms are transmitted to the receiver antenna array 18 of the receiver 16 via a communications channel that comprises a plurality of signal paths for each OFDM sub-carrier k. The signal paths comprise several spatial-subspace channels $s_{k1}, s_{k2}, \ldots, s_{kp}$ (for simplicity, only the spatial-subspace channels for sub-carrier k are shown). The receiver 16 processes the received data symbol waveforms to provide an output data symbol stream $y_k$ which comprises complex data symbols corresponding to those in the input data symbol stream $x_k$. Alternatively, both the transmitter 12 and the receiver 16 may function as transceivers. The communication system 10 will be described in terms of a generic sub-carrier k, however, it should be understood by those skilled in the art that each of the operations performed by the communication system 10 is repeated for each sub-carrier.

The input data symbol stream $x_k$ is generated from an input binary stream by grouping a number of consecutive bits of the input binary stream and applying a mapping process to these consecutive data bits to generate input data symbols. The mapping process can be any appropriate modulation scheme such as Quadrature Amplitude Modulation (QAM). The input binary stream may be provided by any number of devices such as a computer, a router or an electronic communication device. Similarly, the output data symbol stream $y_k$ is applied to a corresponding de-mapping process to obtain an output binary stream that corresponds to the input binary stream. The output binary stream may be provided to a computer, router or other electronic communication device. It should be understood by those skilled in the art that appropriate hardware (not shown) is connected to the transmitter antenna array 14 for providing digital-to-analog conversion and RF up-conversion prior to transmission of the data symbol waveforms. Corresponding hardware (not shown) is connected to the receiver antenna array 18 for providing RF down-conversion and analog-to-digital conversion after reception of the data symbol waveforms.

The spatial nature of the sub-carriers results from the creation of multiple spatial channels due to the use of multiple antenna elements at the transmitter 12 and the receiver 16. The spatial channels between the transmitter antenna array 14 and the receiver antenna array 18 can be represented by a quasi-static channel matrix $H_k$ which describes the channel between each antenna element of the transmitter antenna array 14 and each antenna element of the receiver antenna array 18 for a given sub-carrier k. Given that an input symbol vector of M elements $X_k$ is applied at the input of the transmitter antenna array 14 and an output symbol vector of N elements $Y_k$ is received at the output of the receiver antenna array 18, then the relation between the input symbol vector $X_k$, the output symbol vector $Y_k$ and the channel matrix $H_k$ is as shown in equation 1.

$$Y_k = H_k X_k + n_k \quad (1)$$

The matrix $H_k$ is an M×N complex-valued channel matrix given by:

$$H_k = \begin{bmatrix} H_k(1,1) & \ldots & H_k(1,N) \\ \vdots & \ddots & \vdots \\ H_k(M,1) & \ldots & H_k(M,N) \end{bmatrix} \quad (2)$$

and $n_k$ is a zero-mean complex Gaussian noise vector.

The plurality of spatial-subspace channels for a given sub-carrier k is due to the use of the SVD operation on the corresponding channel matrix $H_k$. Using the SVD operation, the channel matrix $H_k$ is decomposed into a product of three matrices $U_k$, $\Lambda_k$, and $V_k^*$ as given by equation 3.

$$H_k = U_k \Lambda_k V_k^* \quad (3)$$

where $\Lambda_k$ is a diagonal matrix of real, non-negative singular values, $\lambda_{k,1} > \lambda_{k,2} > \lambda_{k,3} > \ldots > \lambda_{k,p} > 0$ with p=rank($H_k$), $U_k$ and $V_k^*$ are unitary matrices and $V_k^*$ is the complex-conjugate transpose of $V_k$. The dimensions of the matrices are as follows: $H_k$ is M×N, $U_k$ is M×p, $\Lambda_k$ is p×p, and $V_k^*$ is p×N. The magnitude of each singular value relates to the quality of the associated spatial-subspace channel for the OFDM sub-carrier k.

Matrix manipulation can be used to determine the diagonal matrix $\Lambda_k$ based on the channel matrix $H_k$ as given by equation 4.

$$\Lambda_k = V_k H_k U_k^* \tag{4}$$

Starting with equation 1 and first pre-multiplying the input symbol vector $X_k$ with the transmit weight matrix $V_k$ and pre-multiplying the entire right-hand side of equation 1 with the receive weight matrix $U_k^*$, corresponding to the system layout given in FIG. 1, the output symbol vector $Y_k$ is given by equation 5:

$$Y_k = U_k^*(H_k V_k X_k + n_k) = \Lambda_k X_k + U_k^* n_k \tag{5}$$

in which the channel matrix $H_k$ has been diagonalized to provide orthogonal spatial-subspace channels for the sub-carrier k. The channel matrix $H_k$ is diagonalized by controlling the weights applied at the transmitter 12 and receiver 16 in a joint manner (i.e. simultaneously). These weights must be updated on a periodic basis since the channel matrix $H_k$ is quasi-static.

The transmitter 12 further comprises a subspace allocation unit 20, a transmitter link adaptation unit 22, a transmitter weighting unit 24, an IFFT unit 26, a transmitter SVD unit 28 and a training unit 30 connected as shown in FIG. 1. The subspace allocation unit 20 receives the input data symbol stream $x_k$ and divides the input data symbol stream into a plurality of input data symbol sub-streams $x_{k1}$, $x_{k2}$, ..., $x_{kp}$ for allocation on a plurality of spatial-subspace channels $s_{k1}$, $s_{k2}$, ..., $s_{kp}$ for the OFDM sub-carrier k. The transmitter link adaptation unit 22 provides transmission information to the subspace allocation unit 20 which is related to subspace quality information (i.e. the quality of the spatial-subspace channels) for the sub-carrier k. The transmission information is received from the receiver 16 (discussed in further detail below). The subspace allocation unit 20 uses the transmission information for allocating the input data symbol stream $x_k$ on the plurality of spatial-subspace channels $s_{k1}$, $s_{k2}$, ..., $s_{kp}$ since some of the spatial-subspace channels may not be suitable for supporting data transmission (i.e. the singular value associated with a particular spatial-subspace channel may have too low a magnitude). The signal voltage carried by each of these spatial-subspace channels is proportional to the corresponding singular value which provides an indication of whether a spatial-subspace channel is strong or weak. The subspace allocation unit 20 may also apply coding techniques to transmit the input data symbol sub-streams $x_{k1}$, $x_{k2}$, ..., $x_{kp}$ on a combination of spatial-subspace channels as is described in further detail below.

The input data symbol sub-streams $x_{k1}$, $x_{k2}$, ..., $x_{kp}$ are then supplied to the transmitter weighting unit 24 which multiplies the input data symbol sub-streams with complex weighting values provided by the transmit weight matrix $V_k$ for producing transmit-weighted spatial-subspace data. The transmit-weighted spatial-subspace data corresponds to distributing the input data symbol sub-streams over the spatial-subspace channels $s_{k1}$, $s_{k2}$, ..., $s_{kp}$ for sub-carrier k. The spatial-subspace channels $s_{k1}$, $s_{k2}$, ..., $s_{kp}$ may be orthogonal to each other. Ideally orthogonal spatial-subspace channels will not interfere in the spatial domain. Alternatively, the spatial-subspace channels $s_{k1}$, $s_{k2}$, ..., $s_{kp}$ may be dependent on one another (via coding) or there may be a combination of orthogonal and dependent spatial-subspace channels for a given sub-carrier k (as discussed further below). In this example, there are p spatial-subspace channels for sub-carrier k. The total number of communication paths for the communication system 10 is the sum of the number of spatial-subspace channels across all sub-carriers. The output of the transmitter weighting unit 24 is a symbol vector $X_k$ having M elements, wherein the elements of the symbol vector $X_k$ are applied to a separate antenna element of the transmitter antenna array 14.

The transmit-weighted spatial-subspace data is then provided to the IFFT (i.e. Inverse Fast Fourier Transform) unit 26 which is connected to the transmitter antenna array 14. The IFFT unit 26 is a transmitter processing unit that converts the transmit-weighted spatial-subspace data to the time-domain for producing data symbol waveforms for transmission by the transmitter antenna array 14. The IFFT unit 26 operates in a block fashion by collecting a plurality of transmit-weighted spatial-subspace data symbols for each antenna element of the transmitter antenna array 14, and then performing the IFFT operation to generate an OFDM symbol for each antenna element of the transmitter antenna array 14. The IFFT unit 26 is preferably a bank of IFFT operators with the number of IFFT operators being equivalent to the number of transmitting antennas 14. Alternatively, the output of the transmitter weighting unit 24 may be provided to one IFFT operator in a time division manner and the output of the IFFT operator correspondingly provided to one antenna element of the transmitter antenna array 14.

The transmit weight matrix $V_k$ is calculated by the transmitter SVD unit 28 which receives the corresponding channel matrix $H_k$ from the transmitter link adaptation unit 22. Channel related information associated with the channel matrix $H_k$ (rather than the channel matrix itself is included in the transmission information which is sent from the receiver 16 to the transmitter link adaptation unit 22 for the efficient operation of the communication system 10. The channel related information comprises channel impulse response data as will be discussed in further detail below. The transmitter link adaptation unit 22 calculates the channel matrix $H_k$ from the channel related data.

The training unit 30 generates training sequences so that the receiver 16 can estimate the channel matrix $H_k$ and provide the channel related data to the transmitter link adaptation unit 22. The training sequences are provided to the IFFT unit 26 and are preferably training symbols that have a low peak-to-average power. The training symbols are generated in the frequency domain and converted to the time domain by the IFFT unit 26 prior to transmission. Alternatively, the training unit 30 may generate the training signals in the time domain and directly provide these signals to the transmitter antenna array 14. In this case, the training unit 30 would be connected to the transmitter antenna array 14 rather than the IFFT unit 26.

Training symbols are periodically generated and transmitted to the receiver 16 for periodically estimating the channel matrix $H_k$ for each sub-carrier k. Alternatively, depending on the frequency spacing between the sub-carriers, it may be possible that the communication channel for several adjacent sub-carriers can be adequately characterized by a single channel matrix. In this case, a channel matrix $H_r$ and one set of triplet matrices $U_r$, $\Lambda_r$ and $V_r$ can be used to represent a group of adjacent sub-carriers k, ..., k+r.

The training unit 30 is also connected to the subspace allocation unit 20 for providing subspace training sequences to the subspace allocation unit 20. The subspace training sequences are preferably generated in the frequency-domain (i.e. subspace training symbols) and may be similar to the channel training symbols. The subspace training symbols are inserted periodically into the input data symbol sub-streams for tracking changes in the singular values of the singular value matrix $\Lambda_k$. For this purpose, the subspace training symbols are inserted in one spatial-subspace channel at a time. Subspace tracking is discussed in further detail below.

In addition to the receiver antenna array 18, the receiver 16 further comprises an FFT unit 32, a receiver weighting unit 34, a channel estimation unit 36, a data estimation unit 38, a receiver SVD unit 40 and a receiver link adaptation unit 42 connected as shown in FIG. 1. The FFT (i.e. Fast Fourier Transform) unit 32 converts the received data symbol waveforms into the frequency domain. The FFT unit 32 is preferably a bank of FFT operators with the number of FFT operators being equivalent to the number of antenna elements in the receiver antenna array 18. Alternatively, the output of the receiver antenna array 18 may be provided in a time division fashion to one FFT operator.

In general, the received data symbol waveforms comprise transmit-weighted spatial-subspace data symbols, training symbols (channel or subspace) and other data (i.e. synchronization signals) for maintaining the operation of the communication system 10. The FFT unit 32 provides the transmit-weighted spatial-subspace data and the subspace training symbols to the receiver weighting unit 34 while the FFT unit 32 provides the channel training symbols to the channel estimation unit 36.

The receiver weighting unit 34 weights the transmit-weighted spatial-subspace data with complex weighting values provided by the receive weight matrix $U_k^*$ in accordance with equation 5 to provide receive-weighted spatial-subspace data. The receiver weighting unit 34 also weights the subspace training symbols in a similar fashion to provide receive-weighted subspace training symbols. The receiver weighting unit 34 provides the receive-weighted spatial-subspace data and the receive-weighted subspace training symbols to the data estimation unit 38 and the receiver link adaptation unit 42 respectively.

The data estimation unit 38 processes the receive-weighted spatial-subspace data to provide the output data symbol stream $y_k$ for each sub-carrier k. The data estimation unit 38 performs an estimation process since the receive-weighted spatial-subspace data is corrupted by noise. The data estimation unit 38 may also possibly perform a decoding process if coding was used to combine some of the spatial-subspace channels for the sub-carrier k. Further, the data estimation unit 38 may comprise a de-mapper for providing an output data bit stream rather than the output data symbol stream $y_k$.

The channel estimation unit 36 processes the channel training symbols, using a technique described below, for estimating each channel matrix $H_k$. The channel estimation unit 36 is connected to the receiver SVD unit 40 so that the receiver SVD unit 40 can process each channel matrix $H_k$ and determine the corresponding matrices $U_k^*$ and $\Lambda_k$. Accordingly, the receiver SVD unit 40 is connected to the receiver weighting unit 34 for providing the weighting values for each matrix $U_k^*$ to the receiver weighting unit 34. The channel estimation unit 36 also generates channel related data for each channel matrix $H_k$. The generation of the channel related data is described in more detail below.

The channel estimation unit 36 and the receiver SVD unit 40 are also both connected to the receiver link adaptation unit 42 to provide the channel related data and the corresponding singular value matrix $\Lambda_k$ respectively. The receiver link adaptation unit 42 processes the singular value matrix $\Lambda_k$ to determine subspace quality information. The receiver link adaptation unit 42 then determines transmission parameters based on the subspace quality information for the sub-carrier k. The subspace quality information is determined from the magnitude of the singular values which are on the diagonal of the singular value matrix $\Lambda_k$. In general, a singular value with a larger magnitude indicates a better quality spatial-subspace channel on which data can be transmitted. For example, input data symbol sub-streams that are allocated on a strong spatial-subspace channel can be modulated using a higher order modulation scheme in which the data points in the corresponding constellation are spaced closer together, such as 32QAM for example. The receiver link adaptation unit 42 bundles the transmission parameters and the channel related data as channel/transmission information (CTI) and sends the information to the transmitter link adaptation unit 22.

The magnitude of the singular values can change in time, space and frequency. Accordingly, the receiver link adaptation unit 42 continuously adapts the transmission parameters when the channel estimation unit 36 estimates new channel matrices $H_k$ (which is done periodically) and the receiver SVD unit 40 subsequently re-calculates the matrices $U_k^*$ and $\Lambda_k$. The receiver link adaptation unit 42 also processes the receive-weighted subspace training symbols to track variations in the singular value matrix $\Lambda_k$ and provide updated singular value matrices before the receiver SVD unit 40 periodically re-calculates the singular value matrix $\Lambda_k$.

The receiver link adaptation unit 42 is connected to the data estimation unit 38 to provide an initial singular value matrix $\Lambda_k$, updated singular value matrices and transmission parameters for the spatial-subspace channels for a given sub-carrier k. The data estimation unit 38 uses these matrices and the transmission parameters for the estimation and detection of the input data symbols) in the receive-weighted spatial-subspace data which has been corrupted by noise and may have coded spatial-subspace channels. The data estimation unit 38 preferably employs a successive-interference cancellation method for detecting the data symbols on the uncoded spatial-subspace channels. This involves detecting the data symbols received along the strongest spatial-subspace channel first, subtracting these data symbols from the receive-weighted spatial-subspace data, then detecting the data symbols received along the next strongest spatial-subspace channel and subtracting these data symbols from the receive-weighted spatial-subspace data and so on. The strength of the spatial-subspace channels is given by the signal-to-noise-plus-interference ratio of each spatial-subspace channel. If coding is used to combine some of the spatial-subspace channels, then a corresponding decoding/detection method is used by the data estimation unit 38 as will be described in more detail below.

As is commonly known to those skilled in the art, a sequence of algebraic operations for constructing a singular value decomposition that will reach an exact solution for the diagonalization of a matrix in a finite number of operations does not exist. In practice, commonly used SVD algorithms, such as the Jacobi-based algorithms, perform many iterations, such as at least 20 iterations for a MIMO system with a large number of antenna elements, to arrive at a precise solution for providing a singular value matrix $\Lambda_k$ in which the off-diagonal components have a value of zero. However, implementing such an iterative SVD algorithm in the transmitter and receiver SVD units 28 and 40 is too computationally intensive since the SVD operation must be periodically executed for a plurality of channel matrices.

Accordingly, the transmitter and receiver SVD units 28 and 40 implement a partial SVD algorithm or process 50 as outlined in FIG. 2. The matrices are initialized as follows: $\Lambda_{kint}=H_k$, $U_{kinit}=I$ and $V_{kinit}=I$, where I is the identity matrix. The first step 52 of the partial SVD algorithm 50 is to perform n1 iterations of an iterative SVD algorithm, such as the Jacobi algorithm, on a channel matrix $H_k$ to obtain an interim receive weight matrix $U_k'$, an interim singular value matrix $\Lambda_k'$ and an interim transmit weight matrix $V_k'$, where the value of n1 is a low integer preferably chosen in the range of 1 to 4. More preferably, the value of n1 is 2 or 3. It should be understood that any iterative technique could be used. At this point, in the matrix $\Lambda_k'$, the magnitudes of the dominant singular values (i.e. the diagonal components of the $\Lambda_k'$ matrix) start to become noticeable (i.e. a first upper group of diagonal components have much larger values than a second lower group of diagonal components) and the off-diagonal components start having small but non-zero values. A thresholding procedure is then applied to the magnitudes of the singular values of the singular value matrix $\Lambda_k'$ at step 54 to determine the number of spatial-subspace channels $p_k$ for the channel matrix $H_k$. For example, assuming an 8×8 channel matrix $H_k$, the number of practically usable spatial-subspace channels may be three or four. Alternatively, in some sub-carriers, rather than thresholding, a pre-specified number may be used for the number of spatial-subspace channels $p_k$. This pre-specified number may be determined experimentally by examining a plurality of estimated channel matrices for the communication system for a particular sub-carrier k. The pre-specified number of spatial-subspace channels $p_k$ may also be dictated by the cost and complexity of the communication system 10.

The next step 56 in the partial SVD algorithm 50 is to truncate the interim singular value matrix $\Lambda_k'$ by retaining the $p_k \times p_k$ sub-matrix within matrix $\Lambda_k'$ and replacing the remaining entries in the matrix $\Lambda_k'$ with zeros (i.e. zero-padding) to produce a truncated singular value matrix $\Lambda_k''$. The uppermost leftmost corner of the $p_k \times p_k$ sub-matrix coincides with the uppermost leftmost corner of the matrix $\Lambda_k'$. An error in the singular values results from the partial SVD algorithm 50 due to this truncation. However, this error may be compensated for by periodically tracking the singular values in the matrix $\Lambda_k$ which results from the algorithm 50 as described further below. Alternatively, if the error is small then the compensation is not needed. This use of truncation allows for faster convergence in obtaining the SVD of the channel matrix $H_k$. The interim receive and transmit weight matrices $U_k'$ and $V_k'$ are also truncated during this procedure to produce truncated receive and transmit weight matrices $U_k''$ and $V_k''$. The truncated receive weight matrix $U_k''$ consists of the $P_k$ leftmost columns of the matrix $U_k'$ and the truncated transmit weight matrix $V_k''$ consists of the $p_k$ rightmost columns of the matrix $V_k'$.

The next step 58 in the partial SVD algorithm 50 is to perform n2 iterations of the SVD algorithm using the truncated matrices $U_k''$, $\Lambda_k''$ and $V_k''$ to obtain the matrices $U_k$, $\Lambda_k$ and $V_k$. Again, the value of n2 is preferably chosen in the range of 1 to 4. More preferably, the value of n2 is 2 or 3. The inventor has found that the triplet of matrices $U_k$, $\Lambda_k$ and $V_k$ which result from the partial SVD algorithm 50 are an approximation and are quite close to the matrices that result from the use of a full iterative SVD algorithm when applied to a Rician (see later) channel matrix.

In an alternative, rather than selecting a constant number for the iterations n1 and n2 in steps 52 and 58, the magnitude of the off-diagonal components of the interim singular value matrix $\Lambda_k'$ and the truncated singular value matrix $\Lambda_k''$, respectively, may be monitored in relation to the magnitude of the components on the diagonal to determine the number of iterations. For instance, a variable number of iterations n1 and n2 may be performed in steps 52 and 58 until the sum of the square of the magnitude of the off-diagonal components are a pre-specified fraction (for example $1/20^{th}$, $1/50^{th}$ or $1/100^{th}$) of the sum of the square of the magnitude of the diagonal components. However, for computational efficiency, a maximum number of iterations n1 max and n2 max is preferably pre-specified for n1 and n2. For instance, n1 max and n2 max may be 4, 6 or 10.

It may be possible to further process the singular value matrix $\Lambda_k$ which results from the partial SVD algorithm 50 by applying the partial SVD algorithm 50 to the matrix $\Lambda_k$ (whereas previously it was applied to the matrix $H_k$). The advantage of this approach is that the partial SVD algorithm is applied to a reduced size matrix (the matrix $\Lambda_k$ has dimensions $p_k \times p_k$ whereas the matrix $H_k$ had dimensions of M×N) so that the computational complexity does not increase significantly. Further, a better estimate of the singular values in the singular value matrix $\Lambda_k$ can be obtained and the off-diagonal elements of the matrix $\Lambda_k$ will get closer to zero.

The effectiveness and the applicability of the partial SVD algorithm 50 for diagonalizing the channel matrix $H_k$ is possible due to the correlation properties of the channel matrix $H_k$ in certain propagation environments. The channel matrix $H_k$, in environments where there are preferred directions of signal propagation, can be described as Rician in which there is a subset of strong spatial channels within the channel matrix $H_k$ which relate to the strong singular values associated with the channel matrix $H_k$.

As mentioned previously, once the triplet of matrices $U_k$, $\Lambda_k$ and $V_k$ are determined for a sub-carrier k, channel information must be provided to the transmitter 12 in order to diagonalize the channel matrix $H_k$ to provide the spatial-subspace channels for the OFDM sub-carrier k. Referring to FIG. 3a, shown therein is a representation of a set of channel frequency response matrices 60 for the communication system 10 in the frequency domain for sub-carriers k=1 to Fmax. The frequency response of a spatial channel between one transmitter antenna and one receiver antenna is represented by a frequency vector where each sample in the frequency vector is taken from the same location in each of the channel matrices $H_k$.

An equivalent representation of the channel information is shown in FIG. 3b, which shows a set of channel impulse matrices 62 for the communication system 10 in the time domain for time indices g=1 to Tmax. The channel impulse response of a spatial channel between one transmitter antenna and one receiver antenna is represented by a time vector where each sample in the time vector is taken from the same location in each of the channel impulse matrices $h_g$, g=1 to Tmax. In general, there are Tmax samples in each channel impulse response vector.

Referring now to FIG. 3c, the two sets of channel matrices 60 and 62 are related to each other by the Inverse Fourier Transform when going from the frequency domain to the time domain (or alternatively the Fourier Transform when going from the time domain to the frequency domain). In practice, an Inverse Fast Fourier Transform (IFFT) is preferably used to convert from the frequency domain to the time domain. As is well known by those skilled in the art, the IFFT produces a time domain vector of Z samples when provided with a frequency domain vector of Z samples. However, the channel information is encoded differently in the frequency and time domains. In particular, the inventor has realized that most of the channel information is encoded in a first portion of the time domain vector.

Referring now to FIG. 3d, shown therein is a general channel impulse response 64 that defines the spatial channel from a transmitter antenna element b to a receiver antenna element c. As can be seen, the channel impulse response 64 contains a majority of the signal energy (and thus the channel information) in the first $t_i$ samples, with the remainder of the samples in the channel impulse response 64 representing mainly noise. Accordingly, only a portion of the channel impulse response 64 is relevant. Consequently, an improvement in transmission efficiency of the channel information data for the communication system 10 can be obtained by truncating each channel impulse response $h_g$ and transmitting each truncated channel impulse response to the transmitter 12 rather than sending each channel matrix $H_k$ or each transmit weight matrix $V_k$ to the transmitter 12. The value of $t_i$ may be determined by using an amplitude threshold value on each channel impulse response $h_g$ such that after the time sample $t_i$, the amplitudes of the channel impulse response $h_g$ are lower than the amplitude threshold value. Another method to determine the value of $t_i$ is to define a percentage energy threshold value and determine the value of $t_i$ such that the truncated channel impulse response contains a percentage energy of the total energy of the channel impulse response equivalent to the percentage energy threshold (i.e. for example 90% of the total energy). Accordingly, with both of these methods, there may be a different number of samples in each of the truncated channel impulse responses. Alternatively, the value of $t_i$ may be pre-specified and used to truncate each channel impulse response $h_g$ (for example the value of $t_i$ may be chosen to be the length of the OFDM guard interval). The pre-specified value of $t_i$ may be determined through experimental trials and chosen such that accurate channel information is contained in each truncated channel impulse response. The inventor has found that a preferable value for $t_i$ is 64 samples (whereas the original length of the channel impulse response vector is 1024 samples).

As discussed previously, for an exemplary MIMO system with 8 transmitter antenna elements, 8 receiver antenna elements and 768 sub-carriers, assuming 32 bits of data are used for representing a complex number, sending all of the channel matrices $H_k$ to the transmitter 12 requires 1.5 Mbits of data. Alternatively, sending all of the transmit weight matrices $V_k$ to the transmitter 12 requires 0.78 Mbits of data. However, when sending all of the truncated channel impulse responses to the transmitter 12, and assuming that each truncated channel impulse response is truncated to 64 samples, the amount of data required is 8*8*64*32=0.13 Mbits of data. This represents a substantial savings in the amount of transmitted data by a factor of 11 when compared to sending the channel matrices $H_k$ and 6 when compared to sending the transmit weight matrices $V_k$.

Figure 4:
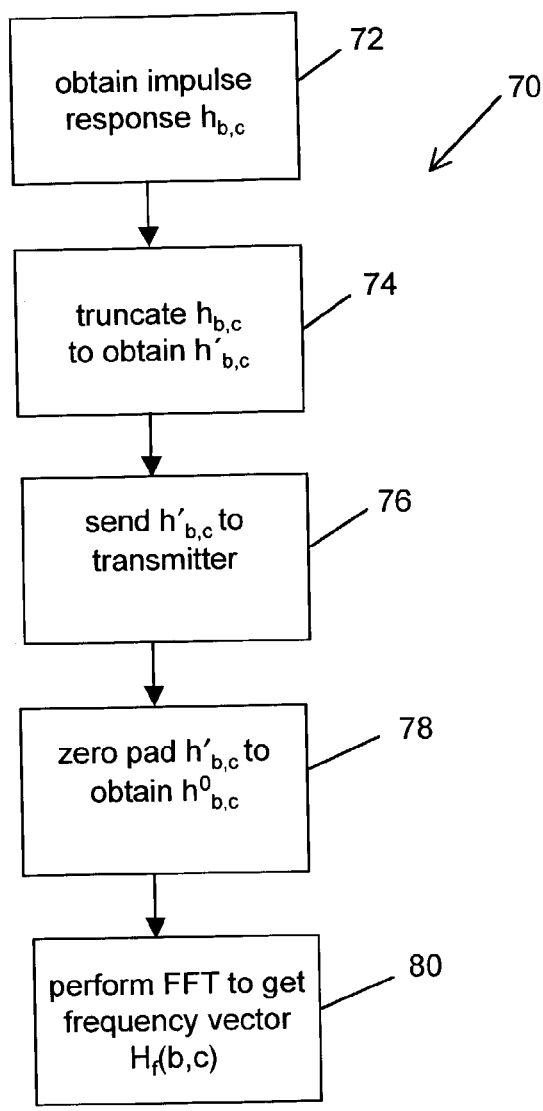
FIG. 4 is a flow diagram of a process for creating channel-related data used by the SVD-based OFDM-MIMO communication system of FIG. 1 based on truncated impulse response data.

Referring now to FIG. 4, shown therein is a process 70 for sending channel related data to the transmitter 12 so that the transmit weight matrices $V_k$ can be calculated at the transmitter 12 for diagonalizing the communication channel of the communication system 10. The process 70 is repeated for each combination of antenna elements from the transmitter antenna array 14 and the receiver antenna array 18. The process 70 begins at step 72 in which the channel impulse response $h_{b,c}$ for transmitter antenna b and receiver antenna c is obtained. This may be done in two fashions. Firstly, a pulse may be sent from the $b^{th}$ transmitter antenna element to the $c^{th}$ receiver antenna element to obtain the channel impulse response $h_{b,c}$. This approach may further include sending several pulses and averaging the resulting channel impulse responses (in the time domain) to reduce noise. Another approach is to send a sequence with good correlation properties and cross-correlate this sequence received at the receiver 16 with a replica of the original sequence at the receiver 16 to obtain an estimate of the channel impulse response. This approach may also include sending several sequences and averaging the resulting channel impulse response estimate to reduce noise. Alternatively, the channel matrices $H_k$ for the system 10 may be obtained using frequency domain techniques by using channel training symbols, as explained further below, to obtain the three dimensional frequency response channel matrix 60. The IFFT is then done on a frequency response vector taken from the $b^{th}$ row and the $c^{th}$ column of the three dimensional frequency channel matrix 60 to obtain the channel impulse response $h_{b,c}$.

The next step 74 is to truncate the channel impulse response $h_{b,c}$ to produce a truncated channel impulse response $h'_{b,c}$ which retains only the first $t_i$ samples of the channel impulse response $h_{b,c}$. As mentioned previously, this truncation provides the benefit of reducing the amount of data that has to be transmitted to the transmitter 12. However, this truncation also provides the benefit of noise reduction since there is mostly noise and not much signal after the first $t_i$ samples in the channel impulse response $h_{b,c}$. The next step 76 is to send the truncated channel impulse response $h'_{b,c}$ to the transmitter 12.

Once the transmitter 12 receives the truncated channel impulse response $h'_{b,c}$, the next step 78 is to zero pad the truncated channel impulse response $h'_{b,c}$ thereby producing a zero-padded channel impulse response $h^o_{b,c}$. The truncated channel impulse response $h'_{b,c}$ is preferably zero-padded to the original length of the channel impulse response $h_{b,c}$. The next step 80 is to perform the FFT on the zero-padded channel impulse response $h^o_{b,c}$. This provides a frequency response vector $H_f(b,c)$ which spans the sub-carriers of the system 10 and corresponds to a row vector along frequency for transmitter antenna element b and receiver antenna element c in the three dimensional frequency response channel matrix 60.

The step 80 of performing the FFT on the zero-padded channel impulse response $h^o_{b,c}$ provides the advantage of spreading out the noise in the truncated channel impulse response $h'_{b,c}$ along a larger number of samples (i.e. from the $t_i$ samples in the truncated channel impulse response $h'_{b,c}$, to the total number of samples in the zero-padded channel impulse response $h^o_{b,c}$). For example, assuming there are 1024 samples in the zero-padded channel impulse response $h^o_{b,c}$ and 64 samples in the truncated channel impulse response $h'_{b,c}$, an improvement of 1024/64 (i.e. 12 dB) in signal to noise ratio is obtained in step 80. The channel estimation unit 36 performs steps 72 to 74 of process 70 and the transmitter link adaptation unit 22 performs steps 78 to 80 of process 70.

The process 70 is performed for the impulse response of each combination of the antenna elements of the transmitter antenna array 14 and the receiver antenna array 18 in order to produce a plurality of frequency response vectors for constructing the three-dimensional frequency response channel matrix 60 at the transmitter 12. The individual channel matrices $H_k$ for each sub-carrier k can then be obtained from the three-dimensional frequency response channel matrix 60 by taking a vertical slice at frequency index k. The SVD can then be performed by the transmitter SVD unit 28 on each of the channel matrices $H_k$ to obtain the corresponding transmit weight matrices $V_k$.

Furthermore, since the communication system 10 may be a frequency duplex system in which a communication channel exists for a first set of sub-carriers from the transmitter 12 to the receiver 16 and for a second set of sub-carriers from the receiver 16 to the transmitter 12, the process 70 may be performed to send channel related data to either the transmitter 12 or the receiver 16. In this case, the communications system can be considered to have a first processing unit and a second processing unit with a communications channel therebetween. The first processing unit sends channel training signals to the second processing unit which estimates channel impulse response data, truncates this data and sends the truncated channel impulse response data to the first processing unit. The first processing unit then zero-pads the truncated channel impulse response data and performs a frequency transform on the zero-padded channel impulse response data to obtain a three-dimensional channel matrix. In one case, the first processing unit may be the transmitter and the second processing unit may be the receiver. In a second case, the first processing unit may be the receiver and the second processing unit may be the transmitter.

Figure 5A:
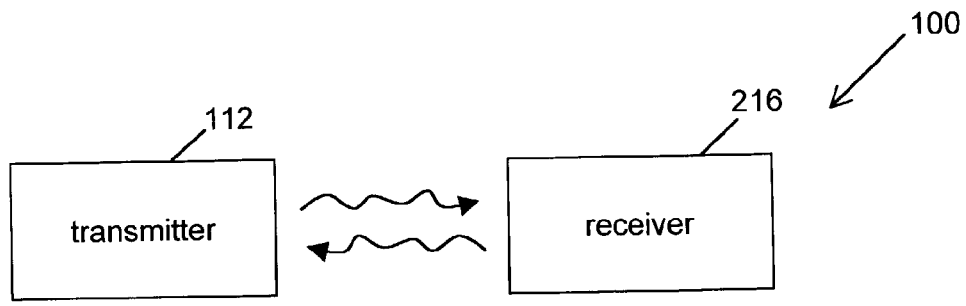
FIG. 5a is a block diagram of an alternative SVD-based OFDM-MIMO communication system.

Referring now to FIG. 5a, shown therein is an alternative SVD-based OFDM-MIMO communication system 100 having a transmitter 112 and a receiver 216. The functionality of the transmitter 112 is similar to the transmitter 12 and the functionality of the receiver 216 is similar to the receiver 16. Accordingly, both the partial SVD algorithm 50 and the process 70 for generating the channel related data using truncated impulse responses is utilized by both transmitter/receiver sets of communication systems 10 and 100 as is the use of OFDM synchronization, data estimation, channel training symbols for channel estimation and subspace training symbols for subspace tracking. Accordingly, components which are common to both transmitters 12 and 112 have reference labels that are offset by 100 and components that are common to both receivers 16 and 216 have reference labels that are offset by 200.

The fine partition of the communication channel in frequency (due to the use of OFDM) and spatial-subspaces (due to the use of SVD-based MIMO) enables the implementation of sophisticated adaptive algorithms for the communication system 100 at the sub-carrier and spatial-subspace level. For instance, adaptive subspace allocation, adaptive subspace coding, adaptive power allocation, and adaptive modulation may be used so that at any time, the available channel resources are preferably utilized optimally for the communication system 100. The receiver 216 determines transmission parameters related to spatial-subspace channel allocation, spatial-subspace channel coding, power allocation and modulation based on the subspace quality information and provides these transmission parameters to the transmitter 112. As mentioned previously, the receiver 216 also provides channel information to the transmitter 112. Accordingly, the data transmission protocol of the communication system 100 is adaptive in time, frequency and space.

Figure 5B:
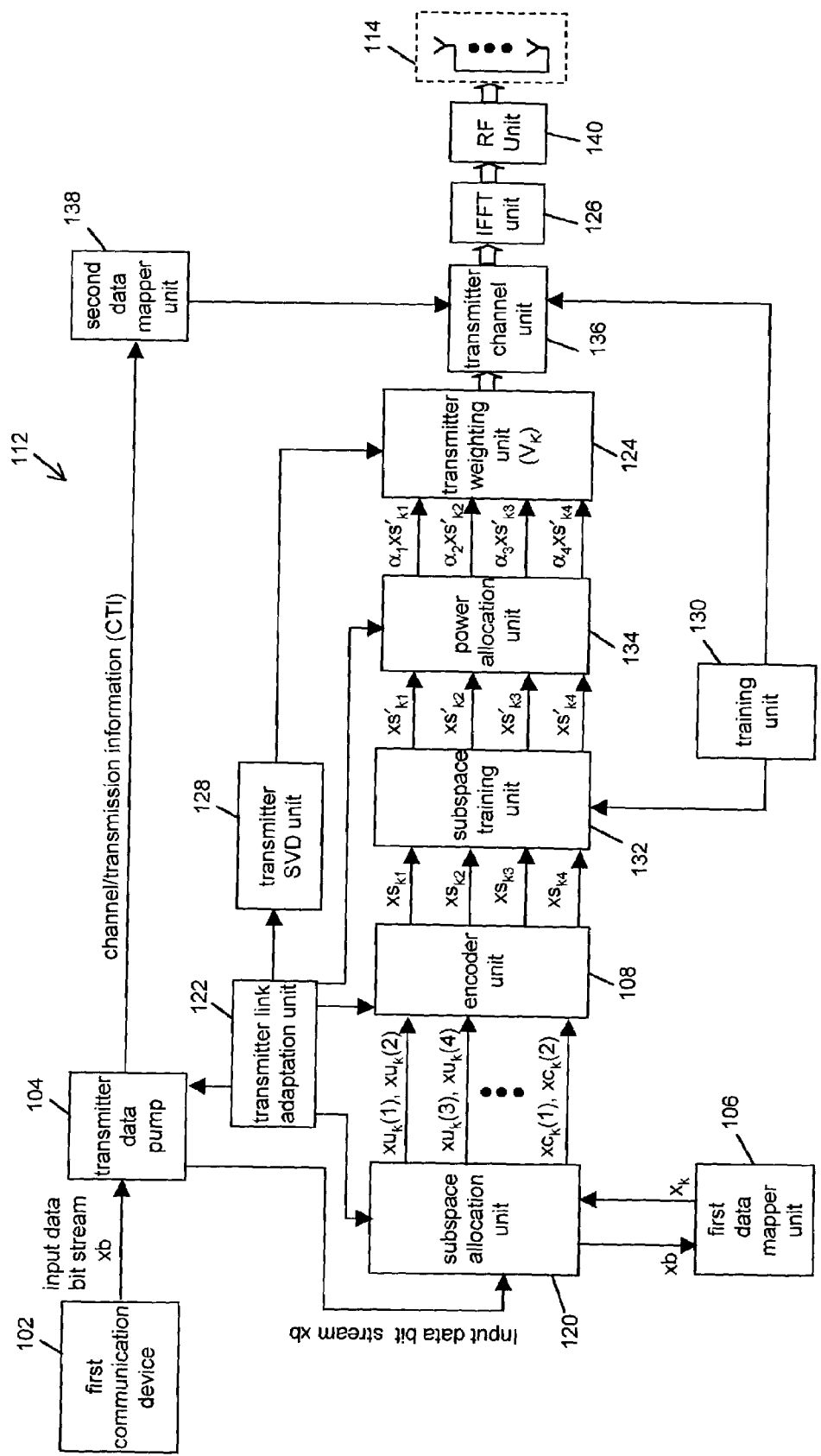

Referring now to FIG. 5b, the transmitter 112 comprises a first communication device 102 that provides an input data bit stream xb comprising binary data to a transmitter data pump 104. The first communication device 102 may be a computer, router or other electronic communication device. The transmitter data pump 104 is a hardware unit that is responsible for routing data to various units in the transmitter 112. A subspace allocation unit 120 receives the input data bit stream xb from the transmitter data pump 104 and transmission parameters from a transmitter adaptation unit 122. The subspace allocation unit 120 uses the transmission parameters for allocating an input data symbol stream $x_k$, derived from the input data bit stream xb, on various spatial-subspace channels for a sub-carrier k. A first data mapper unit 106 applies a particular modulation scheme, specified by the transmitter link adaptation unit 122, to the input data bit stream $x_b$ to generate the input data symbol stream $x_k$ (which in general comprises complex data symbols) and provides the input data symbol stream $x_k$ to the subspace allocation unit 120. The subspace allocation unit 120 provides at least a portion of the transmission parameters to the first data mapper unit 106 for specifying the modulation scheme and the modulation order (i.e. modulation rate).

The transmission parameters used by the subspace allocation unit 120 include information on spatial-subspace channel allocation, spatial-subspace channel coding and the spatial-subspace channel modulation. These parameters are based on the subspace quality information for the associated channel matrix $H_k$. The spatial-subspace channel allocation information indicates which spatial-subspace channels can support data transmission using a desired modulation order. The spatial-subspace channel coding information indicates whether coding should be used to combine two spatial-subspace channels for transmitting data. Spatial-subspace channels of various quality, such as two strong spatial-subspace channels, two weak spatial-subspace channels or a weak and a strong spatial-subspace channel could be combined using coding. Accordingly, the resulting spatial-subspace channels may be orthogonal to each other or the spatial-subspace channels may be dependent on one another (via coding) or there may be a combination of orthogonal and dependent spatial-subspace channels for a given sub-carrier k.

The spatial-subspace channel modulation information, provided to the first data mapper unit 106, indicates the modulation scheme that should be used on each spatial-subspace channel. The modulation scheme which can be used can vary from QAM to Phase Shift Keying (PSK) and Binary Phase Shift Keying (BPSK) with various modulation orders such as 64 QAM, 32 QAM, 16 QAM, 4 QAM, QAM, 64 QPSK, 32 QPSK, 16 QPSK, 4 QPSK, QPSK, BPSK, or other appropriate forms of modulation as is commonly known to those skilled in the art. The higher rates of modulation are used for stronger spatial-subspace channels, since the data points in the constellations corresponding to higher modulation rates are closer together and require a channel with a better signal to noise ratio for minimizing data transmission errors. In each case, the signal to interference and noise ratio (SINR) for a spatial-subspace channel can be examined to ensure that a certain bit-error rate (BER) is maintained during transmission on a particular spatial-subspace channel or a plurality of coded spatial-subspace channels. The SINR for a spatial-subspace channel will depend on the magnitudes of the singular value and the noise and interference associated with that spatial-subspace channel.

Alternatively, the subspace allocation unit 120 and the first data mapper unit 106 can work in unison for a joint mapping and allocation of the input data symbol stream $x_k$ according to an inter-spatial-subspace channel multi-resolution modulation scheme. The inter-spatial-subspace channel multi-resolution modulation scheme, for a given modulation scheme, specifies that the input data symbols that are the furthest apart from each other in the corresponding constellation, are allocated to weaker spatial-subspace channels. For instance, the input data symbols may be at the four corners of the constellation. Since the input data symbols are spaced far apart from one another in the constellation, these input data symbols may be placed in weaker spatial-subspace channels where it should still be possible to distinguish these input data symbols from one another despite noise corruption during data transmission. In contrast, the input data symbols that are spaced closer together in the constellation for the modulation scheme, are allocated to the stronger spatial-subspace channels. For instance, the input data symbols may be at the center of the constellation. Since the input data symbols are spaced close together, stronger spatial-subspace channels which have a larger SINR are needed since it will not take as much noise to cause these input data symbols to interfere with one another as it would for input data symbols that are positioned at the four corners of the constellation. The advantage of the inter-spatial-subspace channel multi-resolution modulation scheme is reduced processing complexity since the same constellation size (i.e. modulation rate or order) is used for both strong and weak spatial-subspace channels.

The subspace allocation unit 120 provides a plurality of input data symbol sub-streams with each data symbol sub-stream being allocated to a spatial-subspace channel. In general, there are two categories of input data symbol sub-streams: "$q_k$" input data symbol sub-streams that are allocated on coded spatial-subspace channels and "$r_k$" input data symbol sub-streams that are allocated on uncoded spatial-subspace channels, where r and k are integers that are greater than or equal to 0. The input data symbols received from the first data mapper unit 106 that are assigned to the coded spatial-subspace channels are represented by xc and the input data symbols that are assigned to the uncoded spatial-subspace channels are represented by xu.

The number of consecutive input data symbols that are processed at a time depends on the type of coding which is done on the spatial-subspace channels. For instance, if block space-time coding is used for coding the spatial-subspace channels, then two consecutive input data symbols are preferably processed at a time. In this case, the subspace allocation unit 120 preferably allocates the input data symbol sub-streams in the following fashion: a) a first data symbol sub-stream comprises two input data symbols $xu_k(1)$ and $xu_k(2)$ that are allocated on the first spatial-subspace channel which is uncoded, b) a second data symbol sub-stream comprises two input data symbols $xu_k(3)$ and $xu_k(4)$ that are allocated on the second spatial-subspace channel which is uncoded and c) a third data symbol sub-stream comprises two input data symbols $xc_k(1)$ and $xc_k(2)$ that are allocated on the third and fourth spatial-subspace channels which are coded. However, there could be other forms of coding in which more than two input data symbol sub-streams are coded and there are a corresponding number of coded spatial-subspace channels.

The subspace allocation unit 120 provides the input data symbol sub-streams to an encoder unit 108. The encoder unit 108 possibly codes the input data symbol sub-streams thereby producing uncoded/coded input data symbol sub-streams $xs_{k1}$, $xs_{k2}$, $xs_{k3}$ and $xs_{k4}$. Accordingly, the uncoded/coded input data symbol sub-streams may possibly comprise at least one uncoded input data symbol sub-stream for allocation on a corresponding at least one uncoded spatial-subspace channel and may possibly comprise at least one pair of coded input data symbol sub-streams for allocation on a corresponding at least one pair of coded spatial-subspace channels. In this example, there are four spatial-subspace channels with two of the channels being uncoded and two of the channels being coded. In general, there are several possibilities for the spatial-subspace channels. For instance, each spatial-subspace channel may be uncoded or there may be at least one spatial-subspace channel that is uncoded with the remaining pairs of spatial-subspace channels being coded. Alternatively, there may only be coded spatial-subspace channels.

The transmitter adaptation unit 122 is connected to the encoder unit 108 to provide transmission parameters that indicate which spatial-subspace channels are uncoded and which are coded. The encoder unit 108 simply passes the input data symbol sub-streams xu which are to be sent on the uncoded spatial-subspace channels $s_{k1}$ and $s_{k2}$ and processes the input data sub-streams xc that are to be sent on the coded spatial-subspaces $s_{k3}$ and $s_{k4}$ (in this example). The encoder unit 108 preferably uses block space-time coding with a depth of two input data symbols (as shown in Table 1) to create an equivalent channel from two spatial-subspace channels such that a desired BER is maintained for a given modulation scheme. Alternatively, other forms of coding may be used such as space-frequency coding or time-frequency coding (both of these forms of coding are commonly known to those skilled in the art).

TABLE 1

| | Space-Time block encoding | |
|---|---|---|
| Data symbol | Spatial-subspace channel 3 | spatial-subspace channel 4 |
| $xc_k(1)$ | $xc_k(1)$ | $xc_k(2)$ |
| $xc_k(2)$ | $-xc_k*(2)$ | $xc_k*(1)$ |

Note:
$xc_k*(1)$ is the complex conjugate of $xc_k(1)$.

The subspace training unit 132 receives the coded/uncoded input data symbol sub-streams $xs_{k1}$, $xs_{k2}$, $xs_{k3}$ and $xs_{k4}$ from the encoder unit 108 and interleaves subspace training symbols into the coded/uncoded input data symbol sub-streams $xs_{k1}$, $xs_{k2}$, $xs_{k3}$ and $xs_{k4}$ thereby producing input data/training symbol sub-streams $xs'_{k1}$, $xs'_{k2}$, $xs'_{k3}$ and $xs'_{k4}$. Accordingly, the subspace training unit 132 is connected to a training unit 130 to receive the subspace training symbols. The subspace training symbols are interleaved into the coded/uncoded input data symbol sub-streams in an uncoded manner. The subspace training symbols are preferably used to track one spatial-subspace channel at a time.

A power allocation unit 134 is connected to the subspace training unit 132. The power allocation unit 134 receives the input data/training symbol sub-streams $xs'_{k1}$, $xs'_{k2}$, $xs'_{k3}$ and $xs'_{k4}$ and weights each of these sub-streams with a corresponding power coefficient $\alpha_1$, $\alpha_2$, $\alpha_3$ and $\alpha_4$ to obtain power-weighted sub-streams $\alpha_1 xs'_{k1}$, $\alpha_2 xs'_{k2}$, $\alpha_3 xs'_{k3}$ and $\alpha_4 xs'_{k4}$. The power allocation unit 134 is connected to the transmitter adaptation unit 122 in order to receive the portion of the transmission parameters that provides information on spatial-subspace channel power weighting.

Many different power allocation schemes may be implemented by the power allocation unit 134 under the direction of the transmitter link adaptation unit 122. For instance, one spatial-subspace channel may have a much higher SINR than is required for a certain data modulation scheme in which case a portion of the transmitter power may be routed from this spatial-subspace channel to the other spatial-subspace channels for the same sub-carrier k. Other power allocation methods include the water-filling method in which more power is allocated to the strongest spatial-subspace channels. Alternatively, the power allocation coefficients can be based on the average singular value amplitude per spatial-subspace channel across all sub-carriers.

This technique reduces the computational demand at the receiver 216 and the amount of data that needs to be transmitted back to the transmitter 112.

The transmitter weighting unit 124 receives the power-weighted sub-streams $\alpha_1 xs'_{k1}$, $\alpha_2 xs'_{k2}$, $\alpha_3 xs'_{k3}$ and $\alpha_4 xs'_{k4}$ and further weights these sub-streams with transmitter weights to produce transmit-weighted spatial-subspace data. As explained previously for transmitter 12, the transmitter weighting unit 124 multiplies the power-weighted sub-streams with complex weighting values provided by the transmit weight matrix $V_k$ in accordance with equation 5 for diagonalizing the channel matrix $H_k$ for the sub-carrier k. Accordingly, via multiplication with the transmit weight matrix $V_k$, the transmit-weighted spatial-subspace data is now distributed along the various spatial-subspace channels for the sub-carrier k and assigned to each element of the transmitter antenna array 114. This processing is applied to all of the sub-carriers.

The transmit weight matrix $V_k$ is calculated by the transmitter SVD unit 128 and provided to the transmitter weighting unit 124. The transmitter SVD unit 128 calculates the transmit weight matrix $V_k$ from the corresponding channel matrix $H_k$ which is provided by the transmitter link adaptation unit 122. The transmitter link adaptation unit 122 preferably computes the channel matrix $H_k$ in the same fashion described previously for the transmitter link adaptation unit 22 using truncated channel impulse response data.

A transmitter channel unit 136 receives the transmit-weighted spatial-subspace data from the transmitter weighting unit 124 and interleaves channel/transmission information (CTI) and channel training sequences into the transmit-weighted spatial-subspace data thereby producing interleaved spatial-subspace data for transmission to the receiver 216. The channel training symbols are provided by the training unit 130. The channel training sequences are inserted periodically into the transmit-weighted spatial-subspace data so that the receiver 216 can estimate the channel matrices $H_k$. The channel training sequences may also be intermittently inserted for providing synchronization between the transmitter 112 and the receiver 216 (as described below).

The channel/transmission information is inserted into the transmit-weighted spatial-subspace data because the communication system 10 is bidirectional. The transmitter 112 and the receiver 216 actually function as transceivers in a frequency division duplex fashion in which OFDM data waveforms are sent from the transmitter 112 to the receiver 216 in a first frequency range and OFDM data waveforms are sent from the receiver 216 to the transmitter 112 in a second frequency range to increase the rate of data transmission for the communication system 100. Accordingly, the channel matrices $H_k$ must be estimated in both directions and the corresponding matrices $U_k$ and $V_k$ for each channel matrix $H_k$ must be updated at both the transmitter 112 and the receiver 216 for both frequency ranges. The transceiver aspect of the transmitter 112 and the receiver 216 is not emphasized for simplifying the description of the communication system 100. Accordingly, channel/transmission information (CTI) for the OFDM channel from the receiver 216 to the transmitter 112 is measured at the transmitter 112 (in a similar manner to the channel measurement which occurs at the receiver 216) and the channel/transmission information is provided to the transmitter data pump 104. The transmitter data pump 104 is connected to a second data mapper unit 138 which modulates the channel/transmission information using any appropriate modulation scheme as is commonly known to those skilled in the art. The second data mapper unit 138 then provides the modulated channel/transmission information to the transmitter channel unit 136. Alternatively, the system 100 may also operate in a time division duplex manner in which case the channel matrix $H_k$ for each sub-carrier k is symmetrical (i.e. there is no need to feedback the channel information from the transmitter to the receiver; only transmission information need be transmitted).

The interleaved spatial subspace data is partitioned into blocks of data before transmission to the receiver 216. The channel training symbols are provided in a first portion of the block of data for allowing the communication system 100 to periodically estimate the channel matrices $H_k$. The data in each data block is further partitioned into a plurality of data sub-blocks. Synchronization symbols, channel/transmission information and subspace training symbols are interleaved with the transmit-weighted spatial-subspace data in each of the data sub-blocks. The structure of the data blocks and data sub-blocks are described in more detail below.

The transmitter channel unit 136 provides the interleaved spatial-subspace data to the IFFT unit 126. The IFFT unit 126 converts the interleaved spatial-subspace data to the time domain thereby producing data symbol waveforms comprising OFDM data symbols. The RF unit 140 processes the data symbol waveforms for RF transmission by the transmitter antenna array 114. Accordingly, the RF unit 140 comprises hardware for performing digital-to-analog conversion and RF up-conversion to increase the center frequency of the data symbol waveforms. The RF unit 140 may further comprise hardware for interpolating and filtering the data symbol waveforms as is commonly known to those skilled in the art.

Figure 5C:
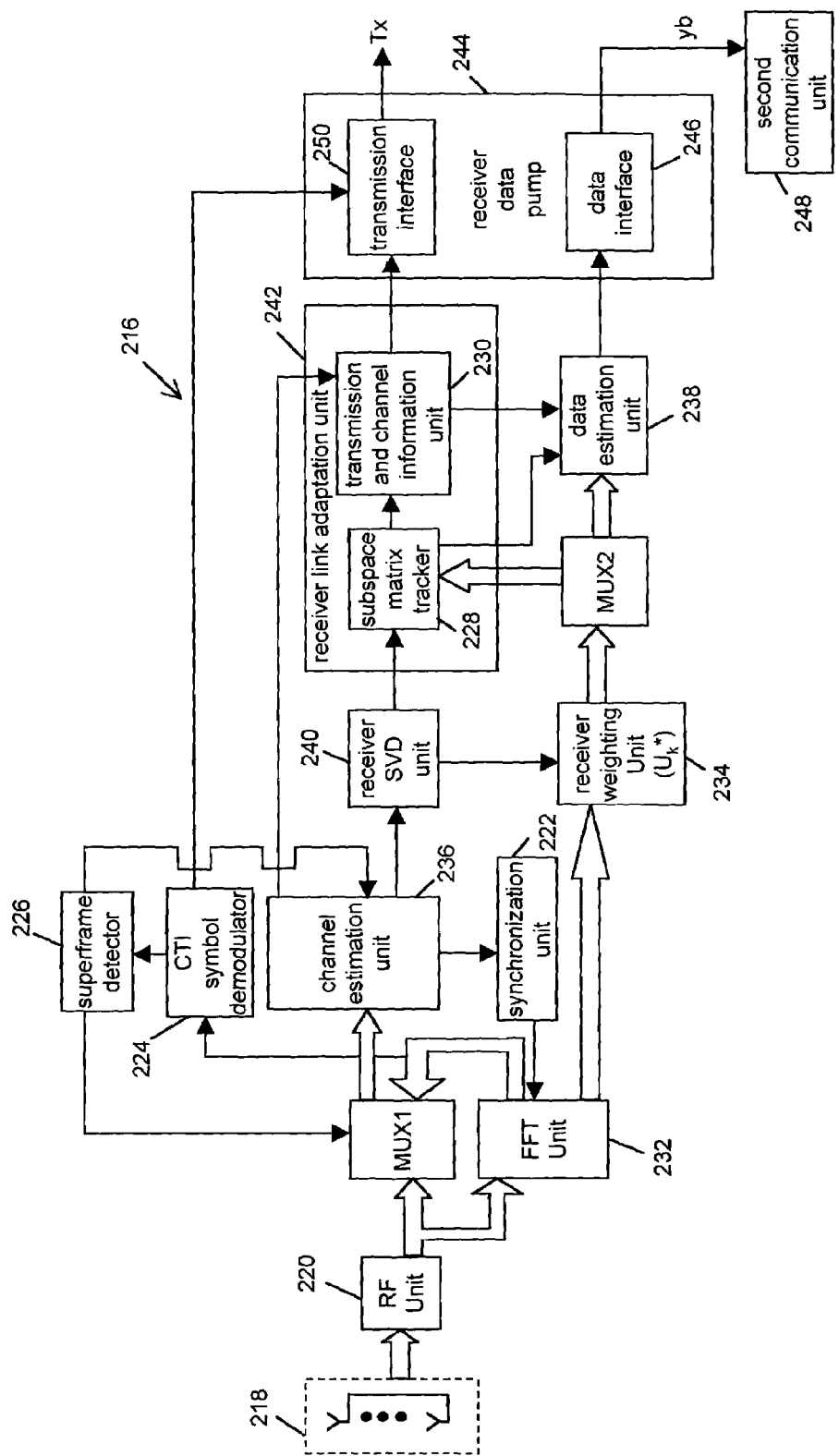

Referring now to FIG. 5c, the receiver 216 comprises a receiver antenna array 218 which receives the data symbol waveforms. An RF unit 220 is connected to the receiver antenna array 218 and processes the data symbol waveforms by RF down-converting these waveforms and performing analog to digital conversion to produce received data symbol waveforms. The received data symbol waveforms are in the time domain. An FFT unit 232, connected to the RF unit 220, processes the received data symbol waveforms to provide received spatial-subspace data which is frequency domain data. The FFT unit 232 and the RF unit 220 are also connected to a first multiplexer MUX1 in order to provide the received data symbol waveforms and the received spatial-subspace data as input data to the first multiplexer MUX1. After the FFT operation, the receiver processing is performed for all sub-carriers individually.

The multiplexer MUX1 provides either the received data symbol waveforms or the received spatial-subspace data to the channel estimation unit 236. When the transmitter 112 first begins to send data symbol waveforms to the receiver 216, the receiver 216 must be synchronized to the transmitter 112 in order for the FFT unit 232 to be able to correctly process the received data symbol waveforms. Accordingly, the channel estimation unit 236 processes at least a portion of the received data symbol waveforms to provide a synchronization signal for the FFT unit 232. A synchronization unit 222, connected to the channel estimation unit 236, receives the synchronization signal and determines a timing offset parameter. The timing offset parameter is then provided to the FFT unit 232.

The channel estimation unit 236 preferably employs a correlation-based synchronization method to recognize repetitive patterns in the received data symbol waveforms (recall that the transmitter 112 inserted synchronization sequences having repetitive patterns into the data that was transmitted). The synchronization process is performed at various times during the operation of the communication system 100. The channel estimation unit 236 preferably calculates the cross-correlation coefficient between two samples spaced a certain number of samples apart in the synchronization sequences. This is repeated over several samples as is commonly known by those skilled in the art. The resulting cross-correlation sequence has a maximum value at a time sample G which corresponds with the end of the repetitive synchronization sequence. The synchronization unit 222 receives the index of time sample G and calculates the timing offset parameter which is then provided to the FFT unit 232.

As mentioned previously in the description of the transmitter 112, the data symbol waveforms that are transmitted also contain channel and transmission information (CTI). Accordingly, the receiver 216 comprises a CTI symbol demodulator 224, connected to the FFT unit 232, that demodulates the CTI information in the received spatial-subspace data. The CTI symbol demodulator 224 performs a decoding/detection process based on the modulation scheme that is used by the second data mapper 138 in the transmitter 112. A super-frame detector 226, connected to the CTI symbol demodulator 224, analyzes the demodulated CTI information to determine whether a new super-frame (discussed below) of OFDM spatial-subspace data is being received by the receiver 216. The super-frame detector 226 may use a correlation technique with a programmable threshold for detecting each new OFDM super-frame. The beginning of each OFDM super-frame contains channel training signals. Accordingly, the super-frame detector 226 is connected to the channel estimation unit 236 and the multiplexer MUX1 to indicate the detection of a new OFDM super-frame. When the beginning of an OFDM super-frame is detected, the multiplexer MUX1 provides the received spatial-subspace data to the channel estimation unit 236 which then estimates the set of channel matrices $H_k$ as described further below.

A receiver SVD unit 240, connected to the channel estimation unit 236, performs the SVD operation on the estimated channel matrices $H_k$, in accordance with the partial SVD algorithm described previously, to obtain the triplet of matrices $V_k$, $\Lambda_k$ and $U^*_k$ for each sub-carrier k. A receiver weighting unit 234, connected to the receiver SVD unit 240, then applies the weights in the matrix $U^*_k$ to the received spatial-subspace data to provide receive-weighted spatial-subspace data. The receiver SVD unit 240 is also connected to a receiver link adaptation unit 242 to provide an initial estimate of the singular value matrix $\Lambda_k$.

A second multiplexer MUX2, connected to the receiver weighting unit 234, routes the receive-weighted spatial-subspace data to either a data estimator unit 238 or the receiver link adaptation unit 242. As mentioned previously in the description of the transmitter 112, the receive-weighted spatial-subspace data comprises, in part, input data symbols and subspace training symbols. When the receive-weighted spatial-subspace data comprises subspace training signals, the receiver link adaptation unit 242 processes the subspace training signals for tracking the subspace variation in the singular value matrix $\Lambda_k$. When the receive-weighted spatial-subspace data comprises input data symbols, the data estimation unit 238 processes the received-weighted spatial-subspace data for estimating output data that is related to the input data bits xb. The estimation may include detection and decoding and the output data may be a data bit stream or a stream of data symbols with associated confidence levels (as discussed further below).

A receiver data pump 244, connected to the data estimation unit 238 and the receiver link adaptation unit 242, routes data and other information to various units in the receiver 216. In particular, the data estimation unit 238 is connected to a data interface 246. The data interface 246 receives the estimated output data and provides this data to a second communication device 248. The second communication device 248 may be a computer, router or the like.

The receiver link adaptation unit 242 comprises a subspace matrix tracker 228 and a transmission and channel information unit 230. The subspace matrix tracker 228 receives an initial estimate of the singular value matrix $\Lambda_k$ from the receiver SVD unit 240. The subspace matrix tracker 228 also processes the subspace training symbols in the receive-weighted spatial-subspace data, received from the multiplexer MUX2, for periodically updating the singular value matrix $\Lambda_k$ as described further below. The subspace matrix tracker 228 is also connected to the data estimation unit 238 for providing the initial estimate of the singular value matrix $\Lambda_k$ and the values in the updated singular value matrix $\Lambda_k$.

The transmission and channel information unit 230 is connected to the subspace matrix tracker 228 to receive the initial estimate of the singular value matrix $\Lambda_k$ for determining subspace quality information for each sub-carrier at the beginning of an OFDM super-frame. The transmission and channel information unit 230 calculates the transmission parameters based on the subspace quality information. The transmission and channel information unit 230 is also connected to the channel estimation unit 236 to receive channel related data. The transmission and channel information unit 230 combines the transmission parameters and the channel related data into channel/transmission information (CTI). The transmission and channel information unit 230 is further connected to a transmission interface 250 of the receiver data pump 244. The transmission interface 250 receives the channel/transmission information from the transmission and channel information unit 230 and routes this information to the transmission portion of the receiver 216, which is similar to the transmitter 112, (recall that the transmitter 112 and the receiver 216 are transceivers) for transmitting the channel/transmission information to the transmitter 112.

The receiver link adaptation unit 242 determines the transmission parameters which include spatial-subspace channel allocation, spatial-subspace channel coding, spatial-subspace channel modulation and spatial-subspace channel power weighting. As mentioned previously, each transmission parameter is determined by examining the signal to interference and noise ratio (SINR) for each spatial-subspace channel for a particular sub-carrier k. A particular combination of spatial-subspace channel allocation, spatial-subspace channel coding, spatial-subspace channel modulation and spatial-subspace channel power weighting can be selected based on the SINR and a desired BER for a given spatial-subspace channel or for a given plurality of coded spatial-subspace channels.

Referring now to FIG. 6a, shown therein is the data structure 300 used by the communication system 100 for transmitting data. At the transmitter 112, the input data symbol stream is divided into a plurality of OFDM super-frames of which three are shown 302, 304 and 306. Each OFDM super-frame comprises a first channel training block 308 which contains channel training symbols and a plurality of OFDM frames of which three are shown 310, 312 and

314. There are $N_F$ OFDM frames in each OFDM super-frame. In general, each OFDM frame comprises a slot for a training/synchronization symbol 316 (i.e. either a training symbol, a synchronization symbol or a training/synchronization symbol (i.e. a symbol used both for training and synchronization)), a slot for a channel/transmission information (CTI) symbol 318 and a plurality of slots for OFDM data symbols for carrying data, of which three are shown 320, 322 and 324. There are $N_S$ OFDM data symbols in an OFDM frame. These symbols may be OFDM symbols in which all the OFDM sub-carriers are used for a particular purpose, i.e. channel training, subspace training, synchronization, channel/transmission information or data. Alternatively, these symbols may be sequences in which a portion of the entire set of sub-carriers is used for a particular purpose. In this case, it could be more generally stated that each OFDM frame comprises a slot for a training/synchronization sequence (i.e. at least one of or a combination of a channel training sequence, a subspace training sequence, a synchronization sequence or a training/synchronization sequence (i.e. a sequence used both for training and synchronization)), a slot for a channel/transmission information (CTI) sequence and a plurality of slots for data sequences. Accordingly, some of these sequences may be combined into an OFDM symbol. In another sense, the slots may contain at least a portion of each of these sequences depending on the length of these sequences and the number of sub-carriers.

Each OFDM symbol preferably comprises a guard portion having duration $T_G$ seconds and a useful information portion having duration $T_U$ seconds. Accordingly, the total duration of an OFDM symbol is $T_S = T_U + T_G$ seconds. The guard portion is used to mitigate intersymbol interference as is commonly known to those skilled in the art. The guard portion may be a cyclic prefix representing a copy of the end of the information portion of the OFDM data symbol.

In general, an OFDM symbol can be one of: a) a training symbol, b) a synchronization symbol, c) a training/synchronization symbol, d) a channel/transmission information symbol CTI and e) a data symbol. The training/synchronization symbol 316 can be a subspace training symbol that is used for subspace tracking or a synchronization symbol that is used for synchronization. In some cases, an OFDM frame may not have a training symbol or a CTI symbol (discussed further below). The length of an OFDM frame and an OFDM super-frame is selected to meet requirements such as time stability of the channel, frequency stability of the reference source and control information bandwidth.

The channel training block 308 is sent at the beginning of each OFDM super-frame for periodically estimating the communication channel. The length of the OFDM super-frame is chosen based on the time wide-sense stationarity of the communication channel. Each channel matrix $H_k$ is estimated, the corresponding triplet of matrices $U_k$, $\Lambda_k$ and $V_k$ are estimated and the channel related data is then calculated. The receiver link adaptation unit 242 then calculates the transmission parameters and provides the channel/transmission information (CTI). These matrices, channel related data and transmission parameters are used for the data transmission that occurs during the next OFDM super-frame. Accordingly, during the first OFDM super-frame, no data symbols are sent. Further, the matrices $U_k$ and $V_k$ and the transmission parameters remain fixed during the next OFDM super-frame. However, the estimated singular value matrix $\Lambda_k$ is used only during a first portion of the next OFDM super-frame and is updated periodically during the remainder of the next OFDM super-frame (as discussed below).

Referring now to FIG. 6b, shown therein is a table showing the elements of an exemplary channel training block. This example assumes that there are 8 transmitter antenna elements as shown in the first column labeled TX. To estimate the channel matrices $H_k$, a plurality of channel training symbols HT are sent from each transmitter antenna element to all of the receiver antenna elements in a time-division manner which allows for the row-wise construction of each channel matrix $H_k$. For example, when transmitter antenna element 1 sends the channel training symbols HT, the first row of each channel matrix $H_k$ can be estimated. Alternatively, rather than strictly using a time-division approach and transmitting from one transmitter antenna element at a time, a combination of time-division and frequency-division may be used in which all transmitter antenna elements transmit at the same time, however, different transmitter antenna elements transmit on different OFDM sub-carriers. For instance, in a first time duration, transmitter antenna element 1 may transmit on OFDM sub-carriers at frequency indices 1, 9, 17, etc., transmitter antenna element 2 may transmit on OFDM sub-carriers at frequency indices 2, 10, 18, etc., and so on. In the next time duration, transmitter antenna element 1 may transmit on OFDM sub-carriers at frequency indices 2, 10, 18, etc., transmitter antenna element 2 may transmit on OFDM sub-carriers at frequency indices 3, 11, 19, etc., and so on. This process may be repeated 8 times so that each transmitter antenna element transmits on each OFDM sub-carrier. Alternatively, interpolation may be used in the frequency domain so that each transmitter antenna need not transmit on each OFDM sub-carrier. Another approach is to transmit orthogonal training sequences in the time domain on all transmitter antenna elements at the same time and then separate the orthogonal training sequences at the receiver using correlation. Yet another approach is to use a single training sequence in which the training sequence is shifted by a different amount at each of the transmitter antenna elements, and correlation is used at the receiver to recover the shifted training sequences.

As shown in FIG. 6b, in the time-division only channel training approach, a plurality of the channel training symbols HT are preferably repeatedly transmitted by each antenna element in the transmitter antenna array 114. This allows for averaging the responses at the receiver 216 when constructing each channel matrix $H_k$ for noise reduction. This is advantageous since the accuracy of channel estimation is affected by noise and quantization error in the receiver 216. In this example, four channel training symbols are sent which provides for a noise reduction of 6 dB in the estimation of each channel matrix $H_k$. A larger or smaller number of training symbols may be repeatedly sent by each transmitter antenna depending on the amount of data/time that can be used for channel estimation.

As mentioned previously, the channel training symbol HT is an OFDM symbol that preferably has a low peak-to-average power ratio in which some of the sub-carriers have a magnitude of zero. More specifically, the channel training symbol HT can be a pseudo-noise sequence in the frequency domain in which every even numbered sub-carrier has a magnitude of either +1 or −1 and every odd numbered sub-carrier has a magnitude of 0. This type of frequency domain sequence has the property of repeating itself twice in the time domain. Accordingly, this frequency domain sequence can also be used for timing synchronization, as is commonly known by those skilled in the art. Accordingly, the channel training symbol HT may be used for both channel estimation, in the channel training block 308 of each OFDM super-frame, and synchronization, in the training/synchronization symbol 316, of each OFDM frame. The channel training symbol HT may also be used for subspace matrix tracking in which case the channel training symbol HT is multiplied by the weighting matrix $V_k$ to provide a subspace training symbol $\Lambda T$. The channel training symbol HT is preferably modulated by BPSK prior to transmission. Alternatively, another low-order modulation scheme may be used.

The channel training symbol HT is modified by the communication channel $H_k(b,c)$ between the transmitting antenna element b that sends the channel training symbol HT and the receiver antenna element c that receives the modified channel training symbol. At the receiver 216, after FFT processing for the receiver antenna element c, the channel estimation unit 236 receives the modified channel training symbol and multiplies it with the original training symbol HT to produce a processed channel training symbol that contains the frequency response of the communication channel $H_k(b,c)$. This multiplication procedure has the effect of removing the BPSK modulation (i.e. +1 or −1) of the modified channel training symbol. Interpolation is then performed on the processed channel training symbol to determine the amplitudes of the odd sub-carrier components of the channel frequency response. This procedure is repeated for each combination of the transmitter and receiving antenna elements to obtain the three-dimensional frequency response matrix 60 shown in FIGS. 3a and 3c.

Referring now to FIG. 6c, shown therein is the format of a CTI symbol which carries the channel/transmission information. Each CTI symbol comprises a header portion and an information portion. The header portion of the CTI symbol contains a unique identifier that signifies the start of an OFDM super-frame if the CTI symbol is in the first frame of an OFDM super-frame (recall that the detection of the first OFDM super-frame is performed by the super-frame detector 226). Otherwise, the header portion of the CTI symbol contains the OFDM frame index (which may be repeated in the header portion for robustness). Accordingly, the header portion of the CTI symbol is used for super-frame synchronization. The information portion of the CTI symbol contains the channel/transmission information which is modulated and may also include forward error correction.

The transmitter 112 and receiver 216 synchronize with one another: 1) when establishing a control channel at the beginning of system operation, 2) at the beginning of each OFDM super-frame (by detecting the super-frame header in the CTI symbols as discussed earlier), and 3) periodically in an OFDM super-frame during the transmission of the OFDM frames. In each of these instances, the channel training symbols HT may be used for correlation-based synchronization as described earlier.

The control channel must be established at the beginning of system operation. One of the transmitter 112 and the receiver 216 is considered a master and the other is considered a slave. At the beginning of system operation, the master transmits on the control channel by sending synchronization symbols via one of the antenna elements of the transmitter antenna array 114. The slave may receive the synchronization symbols on a single antenna element or on all antenna elements of the receiver antenna array 218 (in this case block space-time coding can be used on the control channel for increased robustness). The slave will attempt to synchronize with the synchronization signals. Once synchronization is achieved, the control channel is decoded and the slave can reply on the control channel to signal that a link is established between the master and the slave. The master can then establish the MIMO channels by transmitting the channel training block.

The synchronization process also takes into account the different propagation delays between transmission from the antenna elements of the transmitter antenna array 114 to the antenna elements of the receiver antenna array 218 periodically during an OFDM super-frame. Referring now to FIG. 6d, shown therein is a multiplexing scheme for distributing synchronization symbols SY for the synchronization of each OFDM frame and taking into account the different delays from each transmitter antenna. The synchronization symbols SY are sent separately by each antenna element of the transmitter antenna array 114 so that the different delays from each transmitter antenna element can be measured and compared. There are also blank intervals in which no synchronization symbols are sent in an OFDM frame (i.e. the blank columns in FIG. 6d). However, other training symbols may be sent in these intervals as discussed below. The delay for transmission from each transmitter antenna element is measured indirectly by calculating the timing offset word associated with each transmitter antenna element (as described previously). The largest delay, represented by the largest timing offset parameter, is used for synchronization by the FFT unit 232 such that the largest delay spread falls within the guard portion of the OFDM symbols (it is desirable to perform the FFT as close as possible to the end of the guard interval). This measurement is performed periodically (every 12 OFDM frames in this example) and the largest timing offset parameter is preferably updated after the $12^{th}$ OFDM frame (this measurement may alternatively be performed over shorter or longer time frames as desired).

The SVD-based MIMO model given in equations 1-5 assumes that the channel matrix $H_k$ is perfectly known. However, in practice, only an estimate of the channel matrix $\hat{H}_k$ is available where $\hat{H}_k = H_k + \Delta H_k$. The estimation error of $\Delta H_k$ depends on quantization error, channel noise and the channel estimation method. Accordingly, the channel matrix $H_k$ cannot be truly diagonalized mainly because the $U_k$ and $V_k$ matrices are computed from the matrix $\hat{H}_k$ rather than the matrix $H_k$. This problem of matrix diagonalization is further compounded by the use of the partial SVD algorithm 50 (recall that the singular value matrix $\Lambda_k$ is quasi-diagonal). Consequently, the received data symbol vector $Y_k$ is given by equation 6 rather than equation 5.

$$Y_k = (\Lambda_k - U_k^* \Delta H_k V_k) X_k + U_k^* n_k \qquad (6)$$

In order to detect the transmitted data symbol vector $X_k$ from the received vector, the matrix $\Lambda_{ek} = \Lambda_k - U_k^* \Delta H_k V_k$ should be known. The inventor has realized that the matrix $\Lambda_{ek}$ can be obtained in the same way as $\hat{H}_k$ (i.e. with the use of subspace training symbols $\Lambda T$), the only difference being that for channel estimation, the channel training symbols HT are un-weighted, while for subspace tracking, the subspace training symbols $\Lambda T$ have to be weighted by the weights provided by the matrix $V_k$.

The estimation of the matrix $\Lambda_{ek}$ is less computationally intensive than the estimation of the channel matrices $H_k$ because the matrix $\Lambda_{ek}$ is smaller (i.e. $\Lambda_{ek}$ has a dimension of $p_k \times p_k$) than the channel matrix $H_k$. However, the matrix $\Lambda_{ek}$ is "quasi-diagonal", meaning that the off-diagonal components are small but non-zero. These off-diagonal components represent inter-subspace interference. An example of the quasi-diagonal subspace matrix $\Lambda_{ek}$ is shown in equation 7 for four subspaces.

$$\Lambda_{ek} = \begin{bmatrix} \lambda_{11} & \lambda_{12} & \lambda_{13} & \lambda_{14} \\ \lambda_{21} & \lambda_{22} & \lambda_{23} & \lambda_{24} \\ \lambda_{31} & \lambda_{32} & \lambda_{33} & \lambda_{34} \\ \lambda_{41} & \lambda_{42} & \lambda_{43} & \lambda_{44} \end{bmatrix} \quad (7)$$

The columns of the matrix $\Lambda_{ek}$, for a sub-carrier k, can be determined by sending the subspace training symbols $\Lambda T$ on one spatial-subspace channel at a time. For example, the first row of the matrix $\Lambda_{ek}$ can be determined by allocating the training symbols HT to the first spatial-subspace channel, weighting the training symbols HT by the transmit weight matrix $V_k$ at the transmitter 112 to produce the channel training symbols $\Lambda T$ and transmitting the channel training symbols to the receiver 216. The channel training symbols $\Lambda T$ are then weighted by the receive weight matrix $U^*_k$ at the receiver 216 to provide values for the column in the quasi-diagonal singular value matrix $\Lambda_{ek}$ that corresponds to the first spatial-subspace channel. This is then repeated for each spatial-subspace channel.

Referring now to FIG. 7a, shown therein is a data transmission scheme for sending the subspace training symbols $\Lambda T$ in the OFDM frames of an OFDM super-frame. Time division is used at the spatial-subspace channel level so that the subspace matrix tracker 228 knows which spatial-subspace channel is being estimated. There are gaps in which no subspace training symbols $\Lambda T$ are transmitted for providing the subspace matrix tracker 228 with an opportunity to estimate the column of the quasi-diagonal subspace matrix $\Lambda_{ek}$. After the last spatial-subspace channel is estimated, the singular value matrix $\Lambda_{ek}$ is updated and used by the data estimation unit 238. This process is repeated throughout the OFDM super-frame. Accordingly, the singular value matrix $\Lambda_{ek}$ is continuously being tracked and updated during an OFDM super-frame. In this example, the subspace training symbols $\Lambda T$ are spaced three OFDM frames apart. Furthermore, since there are four spatial-subspace channels in this example, the sequence of $\Lambda T$ training symbols repeat every 12 OFDM frames and the quasi-diagonal subspace matrix $\Lambda_{ek}$ is updated every 12 OFDM frames. The subspace training symbols $\Lambda T$ are generated in the same fashion as the channel training symbols HT and are preferably modulated by BPSK. The subspace training symbols $\Lambda T$ can also be multiplied by the appropriate power coefficient $\alpha_{k1}$, $\alpha_{k2}$, $\alpha_{k3}$ and $\alpha_{k4}$ depending on the spatial-subspace channel that is being tracked.

Referring now to FIG. 7b, shown therein is a data transmission scheme for sending the subspace training symbols $\Lambda T$ on each transmitter antenna element for subspace tracking. Following with the current example, in every $3^{rd}$ OFDM frame, each transmitter antenna element sends the subspace training symbols $\Lambda T$ for a particular spatial-subspace channel. The gaps in the transmission of the subspace training symbols $\Lambda T$ can be used for the transmission of synchronization symbols SY for OFDM frame synchronization as shown in FIG. 7c. It should be understood that the subspace training symbol $\Lambda T$ and the synchronization symbol SY occupy the training/synchronization symbol slot 316 in an OFDM frame (see FIG. 6a).

Figure 8:
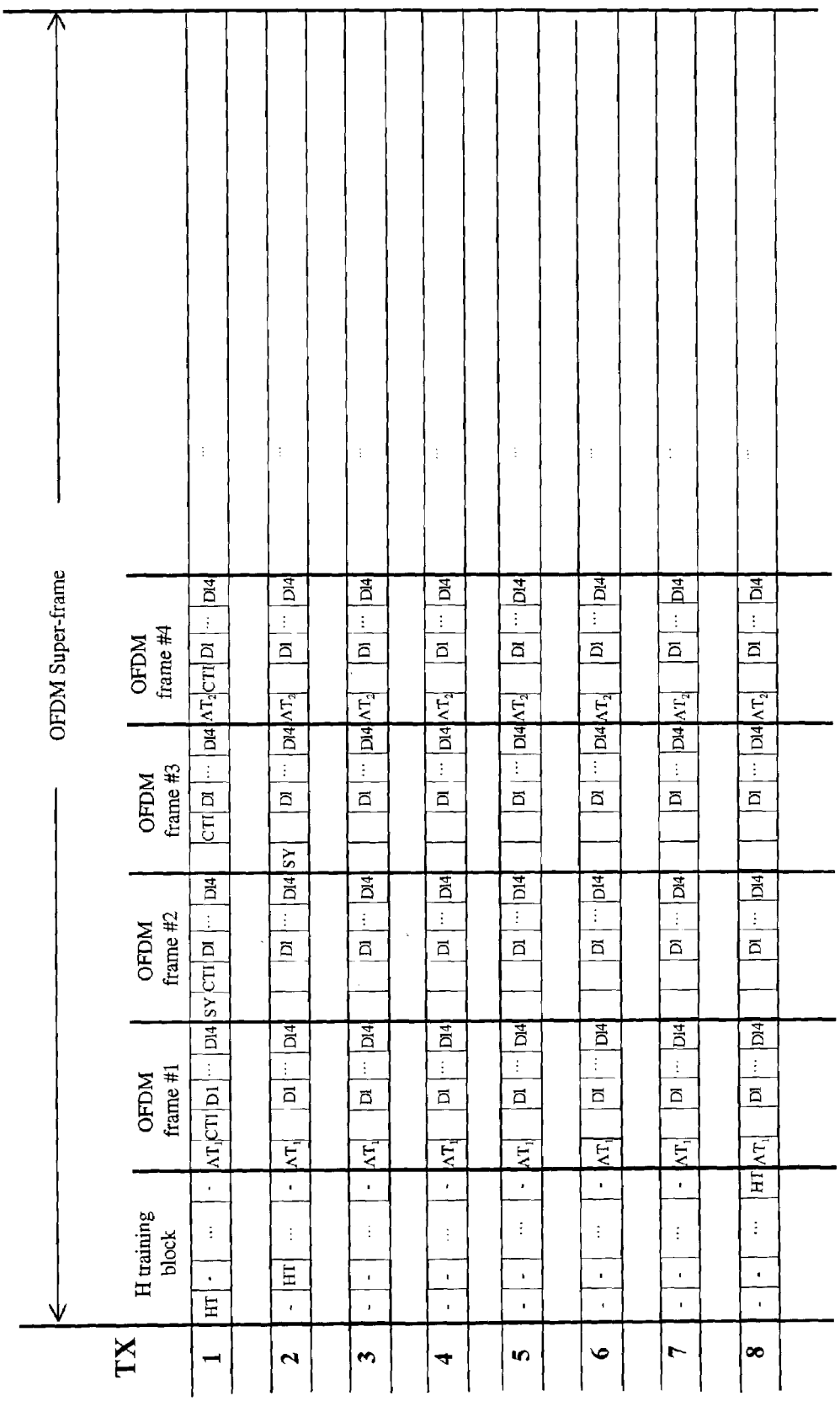
FIG. 8 is a diagram of an example of the overall OFDM data structure used by the communication system of FIGS. 5a to 5c; and, FIG. 9 is a block diagram of a data estimation unit used by the receiver of FIG. 5c.

Referring now to FIG. 8, shown therein is an example of an overall data structure used by the communication system incorporating channel training symbols HT, subspace training symbols $\Lambda T$, synchronization symbols SY, channel/transmission information CTI and data symbols Di. The matrices $U^*_k$, $V_k$ and $\Lambda_k$ and the channel/transmission information CTI have been estimated in the prior OFDM super-frame for use in the current OFDM super-frame. At the beginning of the current OFDM super-frame, the channel training symbols HT are transmitted during the channel training block (it should be understood that each transmitter antenna element can send more than one channel training symbol HT for averaging to produce noise reduction). During the remainder of the current OFDM super-frame, the matrices $U^*_k$, $V_k$ and $\Lambda_k$ and the channel/transmission information is being estimated for use in the next OFDM super-frame.

In the particular example shown in FIG. 8, 14 OFDM data symbols D1, . . . , D14 are transmitted during each OFDM frame (although this can be increased or decreased as desired). Further, in OFDM frames 1 and 4, the subspace training symbols $\Lambda T$ are being sent for subspace tracking for updating the quasi-diagonal subspace matrix $\Lambda_{ek}$ every 12 OFDM frames. In addition, channel/transmission information CTI is sent during every OFDM frame by the first transmitter antenna element and received by each receiver antenna element. In this fashion, space diversity can be used at the receiver 216 for improving the transmission of the channel/transmission information CTI. Alternatively, the channel/transmission information CTI may be transmitted by more than one transmitter antenna element. However, some orthogonality must be imposed on the channel/transmission information CTI sent by each transmitter antenna element so that the receiver 216 can properly receive the channel/transmission information.

Referring once more to FIG. 5c, the data estimation unit 238 employs an iterative decoding/detection process for estimating output data that is related to the receive-weighted spatial-subspace data. Due to complexity, the iterative decoding/detection process is described for the particular case of three spatial-subspace channels in which one spatial-subspace channel is uncoded and the other two spatial-subspace channels are space-time block coded. Further, for exemplary purposes, there are 8 transmitter antenna elements, 8 receiver antenna elements and 3 spatial-subspace channels for sub-carrier k, with the first spatial-subspace channel being uncoded and the second and third spatial-subspace channels being coded. After the FFT unit 232, an 8-element received data symbol vector for the sub-carrier k is multiplied by the 3×8 receive weight matrix $U^*_k$ to provide a 3×1 receive-weighted data symbol vector. This is done for two consecutive received data symbol vectors for forming a 2×3 receive-weighted data symbol matrix $r_k$ that is the input to the data estimation unit 238 as given in equation 8.

$$r_k = \begin{bmatrix} r_{11} & r_{12} \\ r_{21} & r_{22} \\ r_{31} & r_{32} \end{bmatrix} \quad (8)$$

The first column ($r_{11}$, $r_{21}$, $r_{31}$) is the uncoded and coded pair of receive-weighted data symbols respectively for the first receive-weighted data symbol vector and the second column ($r_{12}$, $r_{22}$, $r_{32}$) is the uncoded and coded pair of receive-weighted data symbols respectively for the second receive-weighted data symbol vector.

In this example, the receive-weighted data symbols are decoded/detected in pairs (since they were transmitted as pairs at the transmitter 112 due to the block space-time coding applied to the coded spatial-subspace channels). The operations performed in each iteration of the iterative decoding/detecting process include: (1) decoding and detection of the receive-weighted coded data symbols that are transmitted on the coded spatial-subspace channels ignoring the interference from receive-weighted uncoded data symbols that are transmitted on the uncoded spatial-subspace channel, and (2) estimation and detection of the receive-weighted uncoded data symbols with the receive-weighted coded data symbols replaced by the values detected in step (1). The iterative decoding/detection process is preferably completed in two iterations although more iterations may be used if desired. The detection performed in both steps preferably utilizes the maximum likelihood method.

The quasi-diagonal subspace matrix $\Lambda_{ek}$ for the OFDM sub-carrier k is given by equation 9 for this example of three spatial-subspace channels. The quasi-diagonal subspace matrix $\Lambda_{ek}$ is either the originally calculated subspace matrix or an updated version depending upon within which OFDM frame the decoding/detecting is being done.

$$\Lambda_{ek} = \begin{bmatrix} \lambda_{11} & \lambda_{12} & \lambda_{13} \\ \lambda_{21} & \lambda_{22} & \lambda_{23} \\ \lambda_{31} & \lambda_{32} & \lambda_{33} \end{bmatrix} \quad (9)$$

The first row of the quasi-diagonal subspace matrix $\Lambda_{ek}$ represents the uncoded spatial-subspace channel and the second and third rows represent the coded spatial-subspace channels.

The decoding is performed according to equations 10 and 11 to obtain estimated receive-weighted coded data symbols $e_c(1)$ and $e_c(2)$.

$$e_c(1) = \gamma(\lambda^*_{22}r_{21} + \lambda^*_{32}r_{31} + r^*_{22}\lambda_{23} + r^*_{32}\lambda_{33}) \quad (10)$$

$$e_c(2) = \gamma(\lambda^*_{23}r_{21} + \lambda^*_{33}r_{31} - r^*_{22}\lambda_{22} - r^*_{32}\lambda_{32}) \quad (11)$$

The coefficient $\gamma$ is given by equation 12.

$$\gamma = \frac{1}{\|\lambda_{22}\|^2 + \|\lambda_{32}\|^2 + \|\lambda_{23}\|^2 + \|\lambda_{33}\|^2} \quad (12)$$

The value $\lambda^*_{22}$ is the conjugate of $\lambda_{22}$ and the value $\|\lambda_{22}\|$ is the absolute value of $\lambda_{22}$. Estimated receive-weighted uncoded data symbols $e_u(1)$ and $e_u(2)$ are computed using equations 13 and 14 where $\delta$ is given by equation 15.

$$e_u(1) = \delta(r_{11} - \lambda_{12}r_{21} - \lambda_{13}r_{31}) \quad (13)$$

$$e_u(2) = \delta(r_{12} - \lambda_{12}r_{22} - \lambda_{13}r_{32}) \quad (14)$$

$$\delta = \frac{\lambda^*_{11}}{\|\lambda_{11}\|^2} \quad (15)$$

Detection is performed on the estimated data symbols based on the maximum likelihood method which is well known by those skilled in the art. The modulation scheme used for creating the input data symbols at the transmitter 112 is specified by the receiver link adaptation unit 242. Prior to detection, the estimated receive-weighted coded and uncoded data symbols are power-weighted by coefficients $\beta_1$, $\beta_2$, and $\beta_3$, which are the inverses of the adaptive power allocation coefficients $\alpha_1$, $\alpha_2$ and $\alpha_3$. The maximum likelihood method then produces detected receive-weighted uncoded and coded data symbols by determining which point in the associated constellation of the modulation scheme is closest to the power-weighted estimated receive-weighted uncoded and coded data symbols. The detected uncoded data symbols are $d_u(1)$ and $d_u(2)$ and the detected coded data symbols are $d_c(1)$ and $d_c(2)$.

The following is a step-by-step description of the iterative decoding/detection process for the exemplary receive-weighted data symbol matrix $r_k$ given by equation 8. During the first iteration:

Step 1: Load the symbol matrix $r_k$ with the values in Table 2.

TABLE 2

| Element | Value |
|---------|-------|
| $r_{11}$ | $r_u(1)$ |
| $r_{12}$ | $r_u(2)$ |
| $r_{21}$ | $r_{c1}(1)$ |
| $r_{22}$ | $r_{c1}(2)$ |
| $r_{31}$ | $r_{c2}(1)$ |
| $r_{32}$ | $r_{c2}(2)$ |

The values $r_u(1)$ and $r_u(2)$ are respectively the first and second receive-weighted uncoded data symbols that are received on the first spatial-subspace channel which is uncoded. The values $r_{c1}(1)$ and $r_{c1}(2)$ are respectively the first and second receive-weighted coded data symbols that are received on the second spatial-subspace channel which is coded. The values $r_{c2}(1)$ and $r_{c2}(2)$ are respectively the first and second receive-weighted coded data symbols that are received on the third spatial-subspace channel which is coded.

Step 2: Decode the receive-weighed coded data symbols using equations 10 to 12 and then detect the estimated receive-weighted coded data symbols using the maximum-likelihood method. The detected coded data symbols are $d_c(1)$ and $d_c(2)$.

Step 3: Load the receive-weighted data symbol matrix $r_k$ with the values in Table 3.

TABLE 3

| Element | Value |
|---------|-------|
| $r_{11}$ | $r_u(1)$ |
| $r_{12}$ | $r_u(2)$ |
| $r_{21}$ | $d_c(1)$ |
| $r_{22}$ | $-d^*_c(2)$ |
| $r_{31}$ | $d_c(2)$ |
| $r_{32}$ | $d^*_c(1)$ |

Step 4: Estimate the receive-weighed uncoded data symbols using equations 13 to 15 and then detect the estimated receive-weighed uncoded data symbols using the maximum-likelihood method. The detected uncoded data symbols are $d_u(1)$ and $d_u(2)$. The data symbol vector $[d_u(1); d_u(2); d_c(1); d_c(2)]$ is the result of the first iteration of the iterative decoding/detection process.

Step 5: Apply the adaptive power allocation coefficients $\alpha_i$ and the adaptive subspace coding to the symbols $d_u(1)$, $d_u(2)$, $d_c(1)$, $d_c(2)$ and load the receive-weighted data symbol matrix $r_k$ with these processed values as shown in Table 4.

TABLE 4

| Element | Value |
| --- | --- |
| $r_{11}$ | $d_u(1)$ |
| $r_{12}$ | $d_u(2)$ |
| $r_{21}$ | $d_c(1)$ |
| $r_{22}$ | $-d^*_c(2)$ |
| $r_{31}$ | $d_c(2)$ |
| $r_{32}$ | $d^*_c(1)$ |

Step 6: Perform a second iteration of steps 2 to 5 on Table 4. These iterations comprise:
6.1) Performing step 2
6.2) Saving $e_c(1)$ and $e_c(2)$
6.3) Performing steps 3 and 4
6.4) Saving $e_u(1)$ and $e_u(2)$ The symbol vector $[\beta_1 e_u(1); \beta_1 e_u(2); \beta_2 e_c(1); \beta_3 e_c(2)]$ is the result of the iterative decoding/detection process. The last operation is to recover the output data by de-mapping the detected uncoded and coded data symbols according to the modulation scheme that was originally used to produce the input data symbols prior to transmission. The output data may be obtained by using a de-mapping method that incorporates a hard decision (such as the maximum likelihood method for example) to provide output data bits yb. The data bits yb can then be provided to the data interface 246 of the receiver data pump 244. Alternatively, a de-mapping method that uses a soft decision may be used to provide an output data symbol stream with associated confidence levels. In this case, the data interface 246 includes a decoder, such as a forward error decoder or the like, for determining the output data bits yb based on the output data symbol stream and the associated confidence levels.

The iterative decoding/detection process can be applied to a wide variety of cases for the spatial-subspace channels for a given sub-carrier k such as: 1) there are only uncoded spatial-subspace channels, 2) there is a combination of uncoded and coded spatial-subspace channels and 3) there are only coded spatial-subspace channels. In the first case, a system of independent equations is used for estimation in which the number of equations is equal to the number of uncoded spatial-subspace channels. Each of these independent equations would be similar to equations 13 to 15. Alternatively, if at least one pair of coded spatial-subspace channels is used for data transmission, then the iterative decoding/detection process begins with decoding the receive-weighted coded data symbols using equations based on equations 10 to 12. The estimated receive-weighted coded data symbols are then detected, via the maximum likelihood method for example, to obtain the detected coded data symbols and the receive-weighted coded data symbols are then replaced with the detected coded data symbols. If there are more than one pair of coded spatial-subspace channels then decoding/detection is first performed on the pair of coded spatial-subspace channels with the stronger SINR (i.e. larger magnitude singular values) and then performed on the next strongest pairs of coded spatial-subspace channels. Once all of the coded receive-weighted data symbols are detected, the receive-weighted uncoded data symbols on the uncoded spatial-subspace channels are then processed as described previously. Alternatively, a form of coding may be used in which there are more than two coded spatial-subspace channels which are dependent on one another. In any of the cases where there is more than two coded spatial-subspace channels, the iterative decoding/detection scheme comprises processing data transmitted on at least a portion of the coded spatial-subspace channels in the first step of each iteration.

Figure 9:
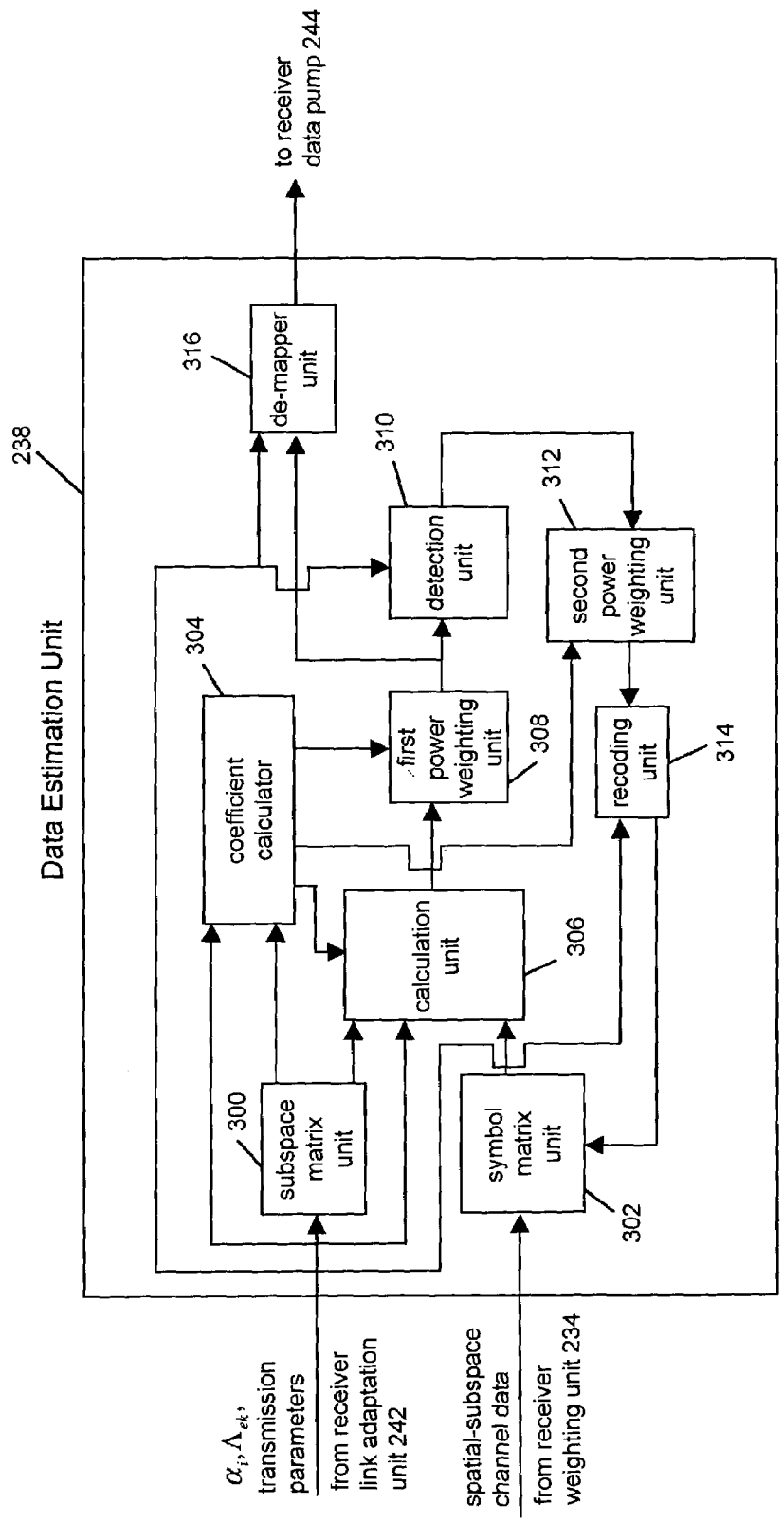

Referring now to FIG. 9, shown therein is a block diagram of the data estimation unit 238 that performs the iterative decoding/detection process. The data estimation unit 238 comprises a subspace matrix unit 300 and a symbol matrix unit 302. The subspace matrix unit 300 is connected to the receiver link adaptation unit 242 to receive the initial singular value matrix $\Lambda_k$ and updates of the quasi-diagonal singular value matrix $\tilde{\Lambda}_{ek}$ (see equation 9). The symbol matrix unit 302 is connected to the receiver weighting unit 234 (via the multiplexer MUX2) to receive the receive-weighted spatial-subspace data and store this data in the receive-weighted data symbol matrix $r_k$.

The data estimation unit 238 further comprises a coefficient calculator 304, a calculation unit 306 and a first power weighting unit 308. The coefficient calculator 304 calculates the various weighting coefficients required by the iterative detection/decoding process. Accordingly, the coefficient calculator 304 is connected to the receiver link adaptation unit 242 to receive the adaptive power allocation coefficients $\alpha_i$ from which the inverse power coefficients $\beta_i$ are calculated. The coefficient calculator 304 is also connected to the subspace matrix unit 300 to receive various components of the quasi-diagonal singular value matrix $\Lambda_{ek}$ for calculating the coefficients $\gamma$ and $\delta$ (see equations 13 and 16).

The calculation unit 306 calculates the estimated receive-weighted uncoded and coded data symbols in the received symbol matrix $r_k$ in accordance with equations 11 to 16. Accordingly, the calculation unit 306 is connected to the coefficient calculator 304 to receive the coefficients $\gamma$ and $\delta$. The calculation unit 306 is also connected to the receiver link adaptation unit 242 to receive the spatial-subspace channel coding transmission parameter for determining whether the spatial-subspace channels for the sub-carrier k are uncoded, coded or a combination of coded and uncoded. As mentioned previously, if a combination of coded and uncoded spatial-subspace channels are transmitted on the sub-carrier k, then the calculation unit 306 performs calculations in accordance with equations 11 to 16 for calculating the estimated receive-weighted uncoded and coded data symbols. Alternatively, if only coded spatial-subspace channels were transmitted on the sub-carrier k, then the calculation unit 306 performs calculations in accordance with equations 11 to 13 for calculating the estimated receive-weighted coded data symbols. In another alternative, if only uncoded spatial-subspace channels are transmitted on the sub-carrier k, then the calculation unit 306 performs calculations in accordance with equations 14 to 16 for calculating the estimated receive-weighted uncoded data symbols.

The first power weighting unit 308 is connected to the calculation unit 306 to receive the estimated receive-weighted coded and uncoded data symbols and weight these estimated data symbols with the weights $\beta_i$. The weights $\beta_i$ are the inverse of the adaptive power allocation coefficients $\alpha_i$ that were used by the power allocation unit 134 of the transmitter 112. The output of the first power weighting unit 308 are power-weighted estimated uncoded and coded data symbols.

A detection unit 310, connected to the first power weighting unit 308, receives the power-weighted estimated uncoded and coded data symbols and applies a detection method to these data symbols. The detection unit 310 preferably applies the maximum likelihood method to these data symbols for producing detected coded data symbols and detected uncoded data symbols. Accordingly, the detection unit 310 is connected to the receiver link adaptation unit 242 to receive the spatial-subspace channel modulation transmission parameter for the sub-carrier k. This parameter specifies the modulation scheme and modulation rate that was used to create these data symbols at the transmitter 112. The detection unit 310 produces the detected symbols by comparing the power-weighted estimated uncoded and coded data symbols with the symbols of the constellation associated with the modulation scheme to find the closest data symbol in the constellation.

The data estimation unit 238 further comprises a second power weighting unit 312 and a recoding unit 314 that are connected between the detection unit 310 and the symbol matrix unit 302. The locations of the weighting unit 312 and the recoding unit 314 are interchangeable. The weighting unit 312 and the recoding unit 314 process the detected uncoded and coded data symbols by weighting these symbols with the adaptive power allocation coefficients $\alpha_i$ and coding these symbols in accordance with the spatial-subspace channel coding transmission parameter. Accordingly, the second power weighting unit 312 is connected to the coefficient calculator 304 to receive the adaptive power allocation coefficients $\alpha_i$ and the recoding unit 314 is connected to the receiver link adaptation unit 242 to receive the channel coding transmission parameter. The processed data is then provided to the symbol matrix unit 302 to be entered within the receive-weighted data symbol matrix $r_k$ so that the data estimation unit 238 may perform another iteration of the iterative decoding/detection process.

The data estimation unit 238 further comprises a de-mapper unit 316 which applies a de-mapping process to the power-weighted estimated uncoded and coded data symbols for obtaining output data. Accordingly, the de-mapper unit 316 is connected to the first power weighting unit 308 to receive the power-weighted estimated uncoded and coded symbols. The de-mapper unit 316 is also connected to the receiver link adaptation unit 242 to receive the spatial-subspace channel modulation transmission parameter so that the de-mapper unit 316 can apply the appropriate constellation during the de-mapping process. The de-mapper unit 316 may utilize a hard or soft decision algorithm in this de-mapping process, as is well known to those skilled in the art. If a hard-decision process is used, then the output data from the de-mapper unit 316 comprises the output data bit stream yb. If a soft decision process is used, then the output data from the de-mapper unit 316 comprises output data symbols with corresponding confidence levels. The power-weighted estimated uncoded and coded data symbols are provided to the de-mapper unit 316 after the data estimation unit 238 has performed a desired number of iterations of the iterative decoding/detection process.

One or more digital signal processor (DSPs), general purpose programmable processors, application specific circuitry and/or FPGAs may be used to implement the various units of the transmitters 12 and 112 and receivers 16 and 216 described herein. In addition, onboard or external ROM, flash EEPROM, or ferroelectric RAM may also be used. In addition, as previously mentioned, the transmitters 12 and 112 and the receivers 16 and 216 described herein actually function as transceivers. These transceivers incorporate the structure of both the transmitter and the receiver with the transmitter and receiver being connected via the data pump.

Various types of coding and error correction can be utilized for the various types of information transmitted by the communication system of the present invention. For instance, turbo product code, as is well known by those skilled in the art, may be used for forward error correction for the data bits xb prior to conversion to data symbols with a selected code rate and generator polynomial. CRC bits could also be included in the data bits xb. Forward error correction can also be applied to the channel/transmission information data.

Although the preceding detailed discussion contains many specifics for the purposes of illustration, anyone of ordinary skill in the art will appreciate that the description is not to be considered as limiting the scope of the present invention, but rather as merely providing a particular preferred working embodiment thereof. For instance, the communication system is not restricted to OFDM-based systems and can be used for any communication system that employs multiple antennas at the transmitter and receiver and transmits data on at least one sub-carrier. Furthermore, the communication system is not restricted to wireless contexts and may exploit any channel having multiple inputs or multiple outputs and certain other characteristics. Accordingly, one skilled in the art will appreciate that many variations and alterations can be made to the embodiment described and illustrated herein, without departing from the present invention, the scope of which is defined in the appended claims.

The invention claimed is:

1. A transmitter for processing an input data symbol stream for transmission over a plurality of spatial-subspace channels of a sub-carrier, wherein said transmitter comprises:

a transmitter Singular Value Decomposition (SVD) unit for calculating an approximation of a transmit weight matrix from a channel matrix corresponding to said sub-carrier by applying a partial SVD algorithm in which said transmitter SVD unit truncates an interim version of said transmit weight matrix to calculate said approximation of said transmit weight matrix; and, a transmitter weighting unit connected to said transmitter SVD unit for weighting a plurality of input data symbol sub-streams with said approximation of said transmit weight matrix for distributing said plurality of input data symbol sub-streams along said plurality of spatial-subspace channels, said plurality of input data symbol sub-streams being derived from said input data symbol stream, wherein said transmitter SVD unit is configured to performs said partial SVD algorithm by performing n1 iterations of an iterative SVD algorithm on said channel matrix to obtain an interim singular value matrix $\Lambda_k'$ and interim weight matrices $U_k'$ and $V_k'$, said interim weight matrix $V_k'$ being said interim version of said transmit weight matrix, and wherein said transmitter SVD unit is further configured to determines a number p of said plurality of spatial-subspace channels, and truncates and zero-pads said interim matrices $\Lambda_k'$, $U_k'$ and $V_k'$ to obtain truncated matrices $\Lambda_k''$, $U_k''$ and $V_k''$; where n1 and p are positive integers.

2. The transmitter of claim 1, wherein said transmitter SVD unit is further configured to performs n2 iterations of said iterative SVD algorithm on said truncated matrices $U_k''$, $\Lambda_k''$ and $V_k''$ to obtain an approximate singular value matrix $\Lambda_k$ and said approximation of said transmit weight matrix; where n2 is a positive integer.

3. The transmitter of claim 2, wherein n1 and n2 are constant integers.

4. The transmitter of claim 3, wherein said constant integers are chosen from the range comprising integers 1 to 4.

5. The transmitter of claim 1, wherein n1 is a variable integer bounded by a constant nmax1 and n1 is determined by performing said iterative SVD algorithm until a sum of squared magnitudes of off-diagonal components of said interim matrix $\Lambda_k'$ is less than or equal to a pre-specified fraction of a sum of squared magnitudes of diagonal components of said interim matrix $\Lambda_k'$.

6. The transmitter of claim 2, wherein n2 is a variable integer bounded by a constant nmax2, and n2 is determined by performing said iterative SVD algorithm until a sum of squared magnitudes of off-diagonal components of said truncated matrix $\Lambda_k''$ is less than or equal to a pre-specified fraction of a sum of squared magnitudes of diagonal components of said truncated matrix $\Lambda_k''$.

7. The transmitter of claim 2, wherein said transmitter SVD unit is further configured to apply the partial SVD algorithm to said approximate singular value matrix $\Lambda_k$.

8. A receiver for processing received spatial-subspace data on a plurality of spatial-subspace channels of a sub-carrier, wherein said receiver comprises:
   a) a receiver Singular Value Decomposition (SVD) unit for calculating an approximation of a receive weight matrix from a channel matrix corresponding to said sub-carrier by applying a partial SVD algorithm in which said receiver SVD unit truncates an interim version of said receive weight matrix to calculate said approximation of said receive weight matrix; and,
   b) a receiver weighting unit connected to said receiver SVD unit for weighting said received spatial-subspace data with said approximation of said receive weight matrix,
   wherein said receiver SVD unit is configured to performs said partial SVD algorithm by performing n1 iterations of an iterative SVD algorithm on said channel matrix to obtain an interim singular value matrix $\Lambda_k'$ and interim weight matrices $U_k'$ and $V_k'$, a complex conjugate transpose of said interim weight matrix $U_k'$ being said interim version of said receive weight matrix, and wherein said receiver SVD unit is further configured to determine a number p of said plurality of spatial-subspace channels and truncates and zero-pads said interim matrices $\Lambda_k'$, $U_k'$ and $V_k'$ to obtain truncated matrices $\Lambda_k''$, $U_k''$ and $V_k''$, where n1 and p are positive integers.

9. The transmitter of claim 8, wherein said transmitter SVD unit is further configured to performs n2 iterations of said iterative SVD algorithm on said truncated matrices $U_k''$, $\Lambda_k''$ and $V_k''$ to obtain an approximate singular value matrix $\Lambda_k$ and said approximation of said transmit weight matrix; where n2 is a positive integer.

10. The receiver of claim 9, wherein n1 and n2 are constant integers.

11. The receiver of claim 10, wherein said constant integers are chosen from the range comprising integers 1 to 4.

12. The receiver of claim 8, wherein n1 is a variable integer bounded by a constant nmax1, and n1 is determined by performing said iterative SVD algorithm until a sum of squared magnitudes of off-diagonal components of said interim matrix $\Lambda_k'$ is less than a pre-specified fraction of a sum of squared magnitudes of diagonal components of said interim matrix $\Lambda_k'$.

13. The receiver of claim 9, wherein n2 is a variable integer bounded by a constant nmax2, and n2 is determined by performing said iterative SVD algorithm until a sum of squared magnitudes of off-diagonal components of said truncated matrix $\Lambda_k''$ is less than a pre-specified fraction of a sum of squared magnitudes of diagonal components of said truncated matrix $\Lambda_k''$.

14. The receiver of claim 9, wherein said receiver SVD unit is further configured to apply the partial SVD algorithm to said approximate singular value matrix $\Lambda_k$.

15. A method for processing an input data symbol stream for transmission over a plurality of spatial-subspace channels of a sub-carrier, wherein said method comprises:
   a) calculating an approximation of a transmit weight matrix from a channel matrix corresponding to said sub-carrier by applying a partial Singular Value Decomposition (SVD) algorithm which comprises truncating an interim version of said transmit weight matrix to calculate said approximation of said transmit weight matrix; and,
   b) weighting a plurality of input data symbol sub-streams with said approximation of said transmit weight matrix for distributing said plurality of input data symbol sub-streams along said plurality of spatial-subspace channels, said plurality of input data symbol sub-streams being derived from said input data symbol stream
   wherein applying said partial SVD algorithm comprises:
   c) performing n1 iterations of an iterative SVD algorithm on said channel matrix to obtain an interim singular value matrix $\Lambda_k'$ and interim weight matrices $U_k'$ and $V_k'$, said interim weight matrix $V_k'$ being said interim version of said transmit weight matrix;
   d) determining a number p of said plurality of spatial-subspace channels; and,
   e) truncating and zero-padding said interim matrices $\Lambda_k'$, $U_k'$ and $V_k'$ to obtain truncated matrices $\Lambda_k''$, $U_k''$ and $V_k''$, where n1 and p are positive integers.

16. The method of claim 15, wherein, applying said partial SVD algorithm further comprises:
   f) performing n2 iterations of said iterative SVD algorithm on said truncated matrices $U_k''$, $\Lambda_k''$ and $V_k''$ to obtain an approximate singular value matrix $\Lambda_k$ and said approximation of said transmit weight matrix, where n2 is a positive integer.

17. The method of claim 16, wherein n1 and n2 are constant integers.

18. The method of claim 17, wherein said constant integers are chosen from the range comprising integers 1 to 4.

19. The method of claim 15, wherein n1 is a variable integer bounded by a constant nmax1, and n1 is determined by performing said iterative SVD algorithm until a sum of squared magnitudes of off-diagonal components of said interim matrix $\Lambda_k'$ is less than a pre-specified fraction of a sum of squared magnitudes of diagonal components of said interim matrix $\Lambda_k'$.

20. The method of claim 16, wherein n2 is a variable integer bounded by a constant nmax2, and n2 is determined by performing said iterative SVD algorithm until a sum of squared magnitudes of off-diagonal components of said truncated matrix $\Lambda_k''$ is less than a pre-specified fraction of a sum of squared magnitudes of diagonal components of said truncated matrix $\Lambda_k''$.

21. The method of claim 16, wherein said method further comprises applying steps (a) to (f) of said partial SVD algorithm to said approximate singular value matrix $\Lambda_k$.

22. A method for processing received spatial-subspace data on a plurality of spatial-subspace channels of a sub-carrier, wherein said method comprises:
   a) calculating an approximation of a receive weight matrix from a channel matrix corresponding to said sub-carrier by applying a partial Singular Value Decomposition (SVD) algorithm which comprises truncating an interim version of said receive weight matrix to calculate said approximation of said receive weight matrix; and, b) weighting said received spatial-subspace data with said approximation of said receive weight matrix, wherein applying said partial SVD algorithm comprises:

c) performing n1 iterations of an iterative SVD algorithm on said channel matrix to obtain an interim singular value matrix, ~' and interim weight matrices $U_k'$ and $V_k'$, a complex-conjugate transpose of said interim weight matrix $U_k'$ being said interim version of said receive weight matrix;

d) determining a number p of said plurality of spatial-subspace channels; and, e) truncating and zero-padding said interim matrices $\Lambda_k'$, $U_k'$ and $V_k'$ to obtain truncated matrices $\Lambda_k''$, $U_k''$ and $V_k''$, where n1 and p are positive integers.

23. The method of claim 22, wherein, applying said partial SVD algorithm further comprises:

f) performing n2 iterations of said iterative SVD algorithm on said truncated matrices $U_k$41 , $\Lambda_k''$ and $V_k''$ to obtain an approximate singular value matrix $\Lambda_k$ and said approximation of said receive weight matrix, where n2 is a positive integer.

24. The method of claim 23, wherein n1 and n2 are constant integers.

25. The method of claim 24, wherein said constant integers are chosen from the range comprising integers 1 to 4.

26. The method of claim 22, wherein n1 is a variable integer bounded by a constant nmax1, and n1 is determined by performing said iterative SVD algorithm until a sum of squared magnitudes of off-diagonal components of said interim matrix $\Lambda_k'$ is less than a pre-specified fraction of a sum of squared magnitudes of diagonal components of said interim matrix $\Lambda_k'$.

27. The method of claim 23, wherein n2 is a variable integer bounded by a constant nmax2, and n2 is determined by performing said iterative SVD algorithm until a sum of squared magnitudes of off-diagonal components of said truncated matrix $\Lambda_k''$ is less than a pre-specified fraction of a sum of squared magnitudes of diagonal components of said truncated matrix $\Lambda_k''$.

28. The method of claim 23, wherein said method further comprises applying steps (a) to (f) of said partial SVD algorithm to said approximate singular value matrix $\Lambda_k$.

29. A communication system comprising a transmitter having a transmitter antenna array and a receiver having a receiver antenna array, wherein said communication system is configured to transmit an input data symbol stream over a plurality of spatial-subspace channels of a sub-carrier between said transmitter and said receiver, said input data symbol stream being partitioned into a plurality of super-frames, wherein said transmitter further comprises:

a) a subspace training unit for inserting subspace training symbols into a plurality of input data symbol sub-streams and producing a plurality of input data/training symbol sub-streams, said plurality of input data symbol sub-streams being derived from said input data symbol stream;

b) a transmitter Singular Value Decomposition (SVD) unit for providing a transmit weight matrix corresponding to said sub-carrier at a beginning of each super-frame in said plurality of super-frames; and, c) a transmitter weighting unit connected to said subspace training unit and said transmitter SVD unit for weighting said plurality of input data/training symbol sub-streams with said transmit weight matrix for distributing said plurality of input data/training symbol sub-streams along said plurality of spatial-subspace channels and providing transmit-weighted spatial-subspace data;

and said receiver further comprises:

d) a receiver SVD unit connected for providing a receive weight matrix corresponding to said sub-carrier and an initial estimate of a corresponding singular value matrix at a beginning of each super-frame of said plurality of super-frames;

e) a receiver weighting unit connected to said receiver SVD unit for receiving received spatial-subspace data related to said transmit-weighted spatial-subspace data and weighting said received spatial-subspace data with said receive weight matrix for providing receive-weighted spatial-subspace data, said receive-weighted spatial-subspace data containing received subspace training symbols;

f) a receiver link adaptation unit connected to said receiver weighting unit and said receiver SVD unit for receiving said initial estimate of said corresponding singular value matrix and processing said received subspace training symbols for periodically providing undated estimates of said corresponding singular value matrix during each super-frame of said plurality of super-frames; and, g) a data estimation unit connected to said receiver weighting unit and said receiver link adaptation unit for receiving said receive-weighted spatial-subspace data, said initial estimate of said corresponding singular value matrix and said undated estimates of said corresponding singular value matrix and providing said estimated output data during each super-frame of said plurality of super-frames, wherein said receiver is configured to periodically process said sub-space training symbols during each super-frame of said plurality of super-frames for estimating output data related to said input data symbol stream, and wherein said transmitter further comprises an encoder unit connected to said subspace training unit for processing said plurality of input data symbol sub-streams for providing at least one of: 1) at least one uncoded data symbol sub-stream for allocation on a corresponding at least one uncoded spatial-subspace channel and 2) at least one pair of coded data symbol sub-streams for allocation on a corresponding at least one pair of coded spatial-subspace channels and wherein said plurality of spatial-subspace channels comprise only uncoded spatial-subspace channels and said data estimation unit is adapted to perform a successive interference cancellation method for providing said estimated output data by detecting receive-weighted data symbols on one of said uncoded spatial-subspace channels, subtracting the detected receive-weighted data symbols from the receive-weighted spatial-subspace data and processing remaining uncoded spatial-subspace channels in a similar fashion wherein the uncoded spatial-subspace channels are processed in order of decreasing signal to noise plus interference ratio.

30. A communication system comprising a transmitter having a transmitter antenna array and a receiver having a receiver antenna array, wherein said communication system is configured to transmit an input data symbol stream over a plurality of spatial-subspace channels of a sub-carrier between said transmitter and said receiver, said input data symbol stream being partitioned into a plurality of super-frames, wherein said transmitter further comprises:

a) a subspace training unit for inserting subspace training symbols into a plurality of input data symbol sub-streams and producing a plurality of input data/training symbol sub-streams, said plurality of input data symbol sub-streams being derived from said input data symbol stream;

b) a transmitter Singular Value Decomposition (SVD) unit for providing a transmit weight matrix corresponding to said sub-carrier at a beginning of each super-frame in said plurality of super-frames; and, c) a transmitter weighting unit connected to said subspace training unit and said transmitter SVD unit for weighting said plurality of input data/training symbol sub-streams with said transmit weight matrix for distributing said plurality of input data/training symbol sub-streams along said plurality of spatial-subspace channels and providing transmit-weighted spatial-subspace data;

and said receiver further comprises:

d) a receiver SVD unit connected for providing a receive weight matrix corresponding to said sub-carrier and an initial estimate of a corresponding singular value matrix at a beginning of each super-frame of said plurality of super-frames;

e) a receiver weighting unit connected to said receiver SVD unit for receiving received spatial-subspace data related to said transmit-weighted spatial-subspace data and weighting said received spatial-subspace data with said receive weight matrix for providing receive-weighted spatial-subspace data, said receive-weighted spatial-subspace data containing received subspace training symbols;

f) a receiver link adaptation unit connected to said receiver weighting unit and said receiver SVD unit for receiving said initial estimate of said corresponding singular value matrix and processing said received subspace training symbols for periodically providing updated estimates of said corresponding singular value matrix during each super-frame of said plurality of super-frames; and, g) a data estimation unit connected to said receiver weighting unit and said receiver link adaptation unit for receiving said receive-weighted spatial-subspace data, said initial estimate of said corresponding singular value matrix and said undated estimates of said corresponding singular value matrix and providing said estimated output data during each super-frame of said plurality of super-frames wherein, said receiver is configured to periodically process said sub-space training symbols during each super-frame of said plurality of super-frames for estimating output data related to said input data symbol stream, said transmitter further comprises an encoder unit connected to said sub-space training unit for processing said plurality of input data symbol sub-streams for providing at least one of: 1) at least one uncoded data symbol sub-stream for allocation on a corresponding at least one uncoded spatial-subspace channel and 2) at least one pair of coded data symbol sub-streams for allocation on a corresponding at least one pair of coded spatial-subspace channels and, wherein said plurality of spatial-subspace channels comprise coded spatial-subspace channels and uncoded spatial-subspace channels and said data estimation unit is adapted to perform an iterative decoding/detection method on the receive-weighted spatial-subspace data for providing said estimated output data, with one iteration of said decoding/detection method comprising: 1) decoding and detecting receive-weighted coded data symbols transmitted on said coded spatial-subspace channels and replacing said receive-weighted coded data symbols in said receive-weighted spatial-subspace data with detected coded data symbols; and, 2) estimating and detecting receive-weighted uncoded data symbols transmitted on said uncoded spatial-subspace channels.

31. A communication system comprising a transmitter having a transmitter antenna array and a receiver having a receiver antenna array, wherein said communication system is configured to transmit an input data symbol stream over a plurality of spatial-subspace channels of a sub-carrier between said transmitter and said receiver, said input data symbol stream being partitioned into a plurality of super-frames, wherein said transmitter further comprises:

a) a subspace training unit for inserting subspace training symbols into a plurality of input data symbol sub-streams and producing a plurality of input data/training symbol sub-streams, said plurality of input data symbol sub-streams being derived from said input data symbol stream;

b) a transmitter Singular Value Decomposition (SVD) unit for providing a transmit weight matrix corresponding to said sub-carrier at a beginning of each super-frame in said plurality of super-frames; and, c) a transmitter weighting unit connected to said subspace training unit and said transmitter SVD unit for weighting said plurality of input data/training symbol sub-streams with said transmit weight matrix for distributing said plurality of input data/training symbol sub-streams along said plurality of spatial-subspace channels and providing weighted spatial-subspace data;

wherein, said receiver is configured to periodically process said sub-space training symbols during each super-frame of said plurality of super-frames for estimating output data related to said input data symbol stream, said transmitter SVD unit is configured to calculate an approximation of said transmit weight matrix from a channel matrix corresponding to said sub-carrier by applying a partial SVD algorithm in which said transmitter SVD unit is configured to truncate an interim version of said transmit weight matrix to calculate said approximation of said transmit weight matrix, and said transmitter SVD unit is configured to performs said partial SVD algorithm by performing n1 iterations of an iterative SVD algorithm on said channel matrix to obtain an interim singular value matrix $\Lambda_k'$ and interim weight matrices $U_k'$ and $V_k'$, said interim weight matrix $V_k'$ being said interim version of said transmit weight matrix, wherein said transmitter SVD unit is further configured to determines a number p of said plurality of spatial-subspace channels, and truncates and zero-pads said interim matrices $\Lambda_k'$, $U_k'$ and $V_k'$ to obtain truncated matrices $\Lambda_k''$, $U_k''$ and $V_k''$, where n1 and p are positive integers.

32. The communication system of claim 31, wherein said transmitter SVD unit is further configured to performs n2 iterations of said iterative SVD algorithm on said truncated matrices $U_k''$, $\Lambda_k''$, and $V_k''$ to obtain an approximate singular value matrix $\Lambda_k$ and said approximation of said transmit weight matrix, where n2 is a positive integer.

33. The communication system of claim 32, wherein said transmitter SVD unit is further configured to apply the partial SVD algorithm to said approximate singular value matrix $\Lambda_k$.

34. A communication system comprising a transmitter having a transmitter antenna array and a receiver having a receiver antenna array, wherein said communication system is configured to transmit an input data symbol stream over a plurality of spatial-subspace channels of a sub-carrier between said transmitter and said receiver, said input data symbol stream being partitioned into a plurality of super-frames, wherein said transmitter further comprises:

a) a subspace training unit for inserting subspace training symbols, into a plurality of input data symbol sub-streams and, producing a plurality of input data/training symbol sub-streams, said plurality of input data symbol sub-streams being derived from said input data symbol stream;

b) a transmitter Singular Value Decomposition (SVD) unit for providing a transmit weight matrix corresponding to said sub-carrier at a beginning of each super-frame in said plurality of super-frames; and, c) a transmitter weighting unit connected to said subspace training unit and said transmitter SVD unit for weighting said plurality of input data/training symbol sub-streams with said transmit weight matrix for distributing said plurality of input data/training symbol sub-streams along said plurality of spatial-subspace channels and providing transmit-weighted spatial-subspace data;

and said receiver further comprises:

d) a receiver SVD unit connected for providing a receive weight matrix corresponding to said sub-carrier and an initial estimate of a corresponding singular value matrix at a beginning of each super-frame of said plurality of super-frames;

e) a receiver weighting unit connected to said receiver SVD unit for receiving received spatial-subspace data related to said transmit-weighted spatial-subspace data and weighting said received spatial-subspace data with said receive weight matrix for providing receive-weighted spatial-subspace data, said receive-weighted spatial-subspace data containing received subspace training symbols;

f) a receiver link adaptation unit connected to said receiver weighting unit and said receiver SVD unit for receiving said initial estimate of said corresponding singular value matrix and processing said received subspace training symbols for periodically providing updated estimates of said corresponding singular value matrix during each super-frame of said plurality of super-frames; and, g) a data estimation unit connected to said receiver weighting unit and said receiver link adaptation unit for receiving said receive-weighted spatial-subspace data, said initial estimate of said corresponding singular value matrix and said updated estimates of said corresponding singular value matrix and providing said estimated output data during each super-frame of said plurality of super-frames, wherein said receiver is configured to periodically process said sub-space training symbols during each super-frame of said plurality of super-frames for estimating output data related to said input data symbol stream, said receiver SVD unit is further configured to calculate an approximation of said receive weight matrix and an approximation of said initial estimate of said corresponding singular value matrix from a channel matrix corresponding to said sub-carrier by applying a partial SVD algorithm in which said receiver SVD unit is configured to truncate interim versions of said receive weight matrix and said initial estimate of said corresponding singular value matrix, and said receiver SVD unit is configured to performs said partial SVD algorithm by performing n1 iterations of an iterative SVD algorithm on said channel matrix to obtain and interim singular value matrix $\Lambda_k'$ and interim weight matrices $U_k'$ and $V_k'$, a complex conjugate transpose of said interim weight matrix $U_k'$ being said interim version of said receive weight matrix and said interim singular value matrix $\Lambda_k'$ being said interim version of said initial estimate of said corresponding singular value matrix, and wherein said receiver SVD unit is further configured to determine a number p of said plurality of spatial-substance channels and truncates and zero-pads said interim matrices $\Lambda_k'$, $U_k'$ and $V_k'$ to obtain matrices $\Lambda_k''$, $U_k''$, and $V_k''$, where n1 and p are positive integers.

35. The communication system of claim 34, wherein said receiver SVD unit is further configured to performs n2 iterations of said iterative SVD algorithm on said truncated matrices $\Lambda_k''$, $U_k''$, and $V_k''$ to obtain said approximation of said initial estimate of said corresponding singular value matrix $\Lambda_k$ and said approximation of said receive weight matrix, where n2 is a positive integer.

36. The communication system of claim 35, wherein said receiver SVD unit is further configured to apply the partial SVD algorithm to said approximation of said initial estimate of said corresponding singular value matrix $\Lambda_k$.

37. A method for transmitting an input data symbol stream over a plurality of spatial-subspace channels of a sub-carrier between a transmitter and a receiver, said input data symbol stream being partitioned into a plurality of super-frames, wherein at the transmitter said method comprises:

a) inserting subspace training symbols into a plurality of input data symbol sub-streams and producing a plurality of input data/training symbol sub-streams, said plurality of input data symbol sub-streams being derived from said input data symbol stream;

b) providing a transmit weight matrix corresponding to said sub-carrier at a beginning of each super-frame in said plurality of super-frames; and, c) weighting said plurality of input data/training symbol sub-streams with said transmit weight matrix for distributing said plurality of input data/training symbol sub-streams along said plurality of spatial-subspace channels and providing transmit-weighted spatial-subspace data;

wherein, said receiver is configured to periodically process said sub-space training symbols during each super-frame of said plurality of super-frames for estimating output data related to said input data symbol stream and at the receiver said method further comprises:

d) providing a receive weight matrix corresponding to said sub-carrier and an initial estimate of a corresponding singular value matrix at a beginning of each super-frame of said plurality of super-frames;

e) receiving received spatial-subspace data related to said transmit-weighted spatial-subspace data and weighting said received spatial-subspace data with said receive weight matrix for providing receive-weighted spatial-subspace data, said receive-weighted spatial-subspace data containing received subspace training symbols;

f) periodically providing undated estimates of said corresponding singular value matrix by processing said received subspace training symbols during each super-frame of said plurality of super-frames; and, g) providing said estimated output data by processing said receive-weighted spatial-subspace data using said initial estimate of said corresponding singular value matrix and said undated estimates of said corresponding singular value matrix during each super-frame of said plurality of super-frames, wherein step (a) further comprises processing said plurality of input data symbol sub-streams for providing at least one of: 1) at least one uncoded data symbol sub-stream for allocation on a corresponding at least one uncoded spatial-subspace channel and 2) at least one pair of coded data symbol sub-streams for allocation on a corresponding at least one pair of coded spatial-subspace channels; and wherein said plurality of spatial-subspace channels comprise only uncoded spatial-subspace channels and step (g) comprises performing a successive interference cancellation method for providing said estimated output data by detecting receive-weighted data symbols on one of said uncoded spatial-subspace channels, subtracting the detected receive-weighted data symbols from the receive-weighted spatial-subspace data and processing remaining uncoded spatial-subspace channels in a similar fashion wherein the uncoded spatial-subspace channels are processed in order of decreasing signal to noise plus interference ratio.

38. A method for transmitting an input data symbol stream over a plurality of spatial-subspace channels of a sub-carrier between a transmitter and a receiver, said input data symbol stream being partitioned into a plurality of super-frames, wherein at the transmitter said method comprises:

a) inserting subspace training symbols into a plurality of input data symbol sub-streams and producing a plurality of input data/training symbol sub-streams, said plurality of input data symbol sub-streams being derived from said input data symbol stream;

b) providing a transmit weight matrix corresponding to said sub-carrier at a beginning of each super-frame in said plurality of super-frames; and, c) weighting said plurality of input data/training symbol sub-streams with said transmit weight matrix for distributing said plurality of input data/training symbol sub-streams along said plurality of spatial-subspace channels and providing transmit-weighted spatial-subspace data;

wherein, said receiver is configured to periodically process said sub-space training symbols during each super-frame of said plurality of super-frames for estimating output data related to said input data symbol stream and at the receiver said method further comprises:

d) providing a receive weight matrix corresponding to said sub-carrier and an initial estimate of a corresponding singular value matrix at a beginning of each super-frame of said plurality of super-frames;

e) receiving received spatial-subspace data related to said transmit-weighted spatial-subspace data and weighting said received spatial-subspace data with said receive weight matrix for providing receive-weighted spatial-subspace data, said receive-weighted spatial-subspace data containing received subspace training symbols;

f) periodically providing undated estimates of said corresponding singular value matrix by processing said received subspace training symbols during each super-frame of said plurality of super-frames; and, g) providing said estimated output data by processing said receive-weighted spatial-subspace data using said initial estimate of said corresponding singular value matrix and said undated estimates of said corresponding singular value matrix during each super-frame of said plurality of super-frames.

wherein step (a) further comprises processing said plurality of input data symbol sub-streams for providing at least one of: 1) at least one uncoded data symbol sub-stream for allocation on a corresponding at least one uncoded spatial-subspace channel and 2) at least one pair of coded data symbol sub-streams for allocation on a corresponding at least one pair of coded spatial-subspace channels; and wherein said plurality of spatial-subspace channels comprise coded spatial-subspace channels and uncoded spatial-subspace channels and step (g) comprises performing an iterative decoding/detection method on the receive-weighted spatial-subspace data for providing said estimated output data, with one iteration of said decoding/detection method comprising: 1) decoding and detecting of receive-weighted coded data symbols transmitted on said coded spatial-subspace channels and replacing said receive-weighted coded data symbols in said receive-weighted spatial-subspace data with detected coded data symbols; and, 2) estimating and detecting receive-weighted uncoded data symbols transmitted on said uncoded spatial-subspace channels.

39. Method for transmitting an input data symbol stream over a plurality of spatial-subspace channels of a sub-carrier between a transmitter and a receiver, said input data symbol stream being partitioned into a plurality of super-frames, wherein at the transmitter said method comprises:

a) inserting subspace training symbols into a plurality of input data symbol sub-streams and producing a plurality of input data/training symbol sub-streams, said plurality of input data symbol sub-streams being derived from said input data symbol stream;

b) providing a transmit weight matrix corresponding to said sub-carrier at a beginning of each super-frame in said plurality of super-frames; and, c) weighting said plurality of input data/training symbol sub-streams with said transmit weight matrix for distributing said plurality of input data/training symbol sub-streams along said plurality of spatial-subspace channels and providing transmit-weighted spatial-subspace data;

wherein said receiver is configured to periodically process said sub-space training symbols during each super-frame of said plurality of super-frames for estimating output data related to said input data symbol stream, step (b) comprises calculating an approximation of said transmit weight matrix from a channel matrix corresponding to said sub-carrier by applying a partial Singular Value Decomposition (SVD) algorithm which comprises truncating an interim version of said transmit weight matrix, and applying said partial SVD algorithm comprises performing n1 iterations of an iterative SVD algorithm on said channel matrix to obtain an interim singular value matrix $\Lambda_k'$ and interim weight matrices $U_k'$ and $V_k'$, said interim weight matrix $V_k'$ being said interim version of said transmit weight matrix, wherein applying said partial SVD algorithm further comprises determining a number p of said plurality of spatial-subspace channels, and truncating and zero-padding said interim matrices $\Lambda_k'$, $U_k'$ and $V_k'$ to obtain truncated matrices $\Lambda_k''$, $U_k''$ and $V_k''$, where n1 and p are positive integers.

40. The method of claim 39, wherein applying said partial SVD algorithm further comprises performing n2 iterations of said iterative SVD algorithm on said truncated matrices $U_k''$, $\Lambda_k''$ and $V_k''$ to obtain an approximate singular value matrix $\Lambda_k$ and said approximation of said transmit weight matrix, where n2 is a positive integer.

41. A method for transmitting an input data symbol stream over a plurality of spatial-subspace channels of a sub-carrier between a transmitter and a receiver, said input data symbol stream being partitioned into a plurality of super-frames, wherein at the transmitter said method comprises:
   a) inserting subspace training symbols into a plurality of input data symbol sub-streams and producing a plurality of input data/training symbol sub-streams, said plurality of input data symbol sub-streams being derived from said input data symbol stream;
   b) providing a transmit weight matrix corresponding to said sub-carrier at a beginning of each super-frame in said plurality of super-frames; and,
   c) weighting said plurality of input data/training symbol sub-streams with said transmit weight matrix for distributing said plurality of input data/training symbol sub-streams along said plurality of spatial-subspace channels and providing transmit-weighted spatial-subspace data;
wherein, said receiver is configured to periodically process said sub-space training symbols during each super-frame of said plurality of super-frames for estimating output data related to said input data symbol stream, and at the receiver, said method further comprises:
   d) providing a receive weight matrix corresponding to said sub-carrier and an initial estimate of a corresponding singular value matrix at a beginning of each super-frame of said plurality of super-frames;
   e) receiving received spatial-subspace data related to said transmit-weighted spatial-subspace data and weighting said received spatial-subspace data with said receive weight matrix for providing receive-weighted spatial-subspace data, said receive-weighted spatial-subspace data containing received subspace training symbols;
   f) periodically providing updated estimates of said corresponding singular value matrix by processing said received subspace training symbols during each super-frame of said plurality of super-frames; and,
   g) providing said estimated output data by processing said receive-weighted spatial-subspace data using said initial estimate of said corresponding singular value matrix and said updated estimates of said corresponding singular value matrix during each super-frame of said plurality of super-frames,
wherein step (d) comprises calculating an approximation of said receive weight matrix and an approximation of said initial estimate of said corresponding singular value matrix from a channel matrix corresponding to said sub-carrier by applying a partial SVD algorithm which comprises truncating an interim version of said receive weight matrix and said initial estimate of said corresponding singular value matrix, and applying said partial SVD algorithm comprises performing n1 iterations of an iterative SVD algorithm on said channel matrix to obtain an interim singular value matrix $\Lambda_k'$ and interim weight matrices $U_k'$ and $V_k'$, a complex conjugate transpose of said interim weight matrix $U_k'$ being said interim version of said receive weight matrix and said interim singular value matrix $\Lambda_k'$ being said interim version of said initial estimate of said corresponding singular value matrix, wherein applying said partial SVD algorithm further comprises determining a number p of said plurality of spatial-subspace channels and truncating and zero-padding said interim matrices $\Lambda_k'$, $U_k'$ and $V_k'$ to obtain truncated matrices $\Lambda_k''$, $U_k''$ and $V_k''$, where n1 and p are positive integers.

42. The method of claim 41, wherein applying said partial SVD algorithm further comprises performing n2 iterations of said iterative SVD algorithm on said truncated matrices $\Lambda_k''$, $U_k''$ and $V_k''$ to obtain an approximation of said initial estimate of said corresponding singular value matrix $\Lambda_k$ and said approximation of said receive weight matrix, where n2 is a positive integer.

43. The transmitter of claim 1, wherein said n1 iterations are performed until, in said interim singular value matrix $\Lambda_k'$, a first upper group of diagonal components have much larger values than a second lower group of diagonal components and off-diagonal components have small but non-zero values.

44. The transmitter of claim 1, wherein said p number of spatial-subspace channels is determined by applying a threshold to magnitudes of singular values of said interim singular value matrix $\Lambda_k'$.

45. The transmitter of claim 1, wherein said p number of spatial-subspace channels is determined by choosing a pre-specified number which is determined experimentally by examining a plurality of estimated channel matrices.

46. The receiver of claim 8, wherein said n1 iterations are performed until, in said interim singular value matrix $\Lambda_k'$, a first upper group of diagonal components have much larger values than a second lower group of diagonal components and off-diagonal components have small but non-zero values.

47. The receiver of claim 8, wherein said p number of spatial-subspace channels is determined by applying a threshold to magnitudes of singular values of said interim singular value matrix $\Lambda_k'$.

48. The receiver of claim 8, wherein said p number of spatial-subspace channels is determined by choosing a pre-specified number which is determined experimentally by examining a plurality of estimated channel matrices.

49. The method of claim 15, wherein the method comprises performing said n1 iterations until, in said interim singular value matrix $\Lambda_k'$, a first upper group of diagonal components have much larger values than a second lower group of diagonal components and off-diagonal components have small but non-zero values.

50. The method of claim 15, wherein the method comprises determining said p number of spatial-subspace channels by applying a threshold to magnitudes of singular values of said interim singular value matrix $\Lambda_k'$.

51. The method of claim 15, wherein the method comprises determining said p number of spatial-subspace channels by choosing a pre-specified number which is determined experimentally by examining a plurality of estimated channel matrices.

52. The method of claim 22, wherein the method comprises performing said n1 iterations until, in said interim singular value matrix $\Lambda_k'$, a first upper group of diagonal components have much larger values than a second lower group of diagonal components and off-diagonal components have small but non-zero values.

53. The method of claim 22, wherein the method comprises determining said p number of spatial-subspace channels by applying a threshold to magnitudes of singular values of said interim singular value matrix $\Lambda_k'$.

54. The method of claim 22, wherein the method comprises determining said p number of spatial-subspace channels by choosing a pre-specified number which is determined experimentally by examining a plurality of estimated channel matrices.

* * * * *

UNITED STATES PATENT AND TRADEMARK OFFICE
CERTIFICATE OF CORRECTION

| | |
|---|---|
| PATENT NO. | : 7,327,795 B2 |
| APPLICATION NO. | : 10/401955 |
| DATED | : February 5, 2008 |
| INVENTOR(S) | : Oprea |

It is certified that error appears in the above-identified patent and that said Letters Patent is hereby corrected as shown below:

Column 34, line 44, claim 1, the phrase "performs said" has been changed to --perform said--.

Column 34, line 50, claim 1, the phrase "to determines a" has been changed to --to determine a--.

Column 34, line 56, claim 2, the phrase "to performs n2" has been changed to --to perform n2--.

Column 34, line 67, claim 2, the phrase "nmax1 and" has been changed to --nmax1, and--.

Column 35, line 30, claim 8, the phrase "to performs" has been changed to --to perform--.

Column 35, line 43, claim 9, the phrase "The transmitter of claim 8, wherein said transmitter" has been changed to --The receiver of claim 8, wherein said receiver--.

Column 35, line 44, claim 9, the phrase "to performs n2" has been changed to --to perform n2--.

Column 37, line 9, claim 22, the phrase "matrix, ~' and" has been changed to --matrix $\Lambda_k'$ and--.

Column 37, line 21, claim 23, the phrase "matrices $U_k 41$ , $\Lambda_k''$" has been changed to --matrices $U_k''$, $\Lambda_k''$--.

Column 38, line 25, claim 29, the phrase "undated estimates" has been changed to --updated estimates--.

Column 38, line 33, claim 29, the phrase "said undated estimates" has been changed to --said updated estimates--.

Column 39, line 45, claim 30, the phrase" said undated estimates" has been changed to --said updated estimates--.

Column 40, line 31, claim 31, the phrase "providing weighted" has been changed to --providing transmit-weighted--.

UNITED STATES PATENT AND TRADEMARK OFFICE
CERTIFICATE OF CORRECTION

PATENT NO. : 7,327,795 B2
APPLICATION NO. : 10/401955
DATED : February 5, 2008
INVENTOR(S) : Oprea It is certified that error appears in the above-identified patent and that said Letters Patent is hereby corrected as shown below:

Column 40, line 43, claim 31, the phrase "to performs said" has been changed to --to perform said--.

Column 40, line 50, claim 31, the phrase "to determines a" has been changed to --to determine a--.

Column 40, line 56, claim 40, the phrase "to performs n2" has been changed to --to perform n2--.

Column 41, line 7, claim 34, the phrase "symbols, into" has been changed to --symbols into--.

Column 41, line 8, claim 34, the phrase "and, producing" has been changed to --and producing--.

Column 42, line 2, claim 34, the phrase "obtain and interim" has been changed to --obtain an interim--.

Column 42, line 11, claim 34, the phrase "spatial-substance channels" has been changed to --spatial-subspace channels--.

Column 42, line 12, claim 34, the phrase "obtain matrices" has been changed to --obtain truncated matrices--.

Column 42, line 15, claim 35, the phrase "to performs n2" has been changed to --to perform n2--.

Column 42, line 19, claim 35, the phrase "$\Lambda_k$and" has been changed to --$\Lambda_k$ and--.

Column 42, line 60, claim 37, the phrase "providing undated estimates" has been changed to --providing updated estimates--.

Column 42, line 67, claim 37, the phrase "said undated estimates" has been changed to --said updated estimates--.

Column 43, line 55, claim 38, the phrase "providing undated estimates" has been changed to --providing updated estimates--.

Column 43, line 62, claim 38, the phrase "said undated estimates" has been changed to --said updated estimates--.

UNITED STATES PATENT AND TRADEMARK OFFICE
CERTIFICATE OF CORRECTION

PATENT NO. : 7,327,795 B2
APPLICATION NO. : 10/401955
DATED : February 5, 2008
INVENTOR(S) : Oprea It is certified that error appears in the above-identified patent and that said Letters Patent is hereby corrected as shown below:

Column 43, line 64, claim 38, the phrase "super-frames." has been changed to --super-frames,--.

Column 44, line 18, claim 39, the phrase "39. Method for" has been changed to --39. A method for--.

Signed and Sealed this

Sixteenth Day of September, 2008

JON W. DUDAS
*Director of the United States Patent and Trademark Office*